(12) United States Patent
Elfman

(10) Patent No.: US 10,967,816 B2
(45) Date of Patent: Apr. 6, 2021

(54) DC ENERGY TRANSFER APPARATUS, APPLICATIONS, COMPONENTS, AND METHODS

(71) Applicant: Richard H. Sherratt and Susan B. Sherratt Trust Fund, Alameda, CA (US)

(72) Inventor: Brian Elfman, Alameda, CA (US)

(73) Assignee: Richard H. Sherratt and Susan B. Sherratt Revocable Trust Fund, Alameda, CA (US)

( * ) Notice: Subject to any disclaimer, the term of this patent is extended or adjusted under 35 U.S.C. 154(b) by 0 days.

(21) Appl. No.: 16/714,615

(22) Filed: Dec. 13, 2019

(65) Prior Publication Data
US 2020/0114841 A1 Apr. 16, 2020

Related U.S. Application Data

(60) Division of application No. 15/644,623, filed on Jul. 7, 2017, now Pat. No. 10,814,806, which is a continuation of application No. 15/003,686, filed on Jan. 21, 2016, now Pat. No. 9,713,993, which is a continuation of application No. 14/805,315, filed on Jul. 21, 2015, now Pat. No. 9,287,701.

(60) Provisional application No. 62/194,748, filed on Jul. 20, 2015, provisional application No. 62/027,677, filed on Jul. 22, 2014.

(51) Int. Cl.
*B60R 16/023* (2006.01)
*B60L 15/20* (2006.01)
*H01H 47/00* (2006.01)
*B60L 1/00* (2006.01)
*H02P 29/00* (2016.01)
*H02J 1/00* (2006.01)

(52) U.S. Cl.
CPC ............ *B60R 16/0231* (2013.01); *B60L 1/00* (2013.01); *B60L 15/2045* (2013.01); *H01H 47/00* (2013.01); *H02J 1/00* (2013.01); *H02P 29/00* (2013.01); *B60L 2210/12* (2013.01); *Y02T 10/64* (2013.01); *Y02T 10/72* (2013.01)

(58) Field of Classification Search
CPC combination set(s) only.
See application file for complete search history.

(56) References Cited

U.S. PATENT DOCUMENTS 5,149,214 A * 9/1992 Futagawa ............ H01F 7/1883
400/157.2
5,815,388 A * 9/1998 Manley ............ H01J 37/32027
363/63

(Continued)

*Primary Examiner* — Jorge L Carrasquillo
(74) *Attorney, Agent, or Firm* — Staniford Tomita LLP

(57) ABSTRACT

An apparatus having an electrical generator and an energy transfer device coupled to the generator. The energy transfer device has a first capacitor having a capacitance of at least 1 Farad and storing at least 1 MegaJoule of energy, a high-energy inductor coupled to the first capacitor, a second capacitor having capacitance of at least 100 Farads, a switch coupling the second capacitor to the first capacitor and configured to store energy from the first capacitor in the second capacitor through the inductor when in a closed state. The apparatus further has an energy transfer controller controlling an open or closed state of the switch, and an electrical motor coupled to the energy transfer device and a mechanical drive system.

19 Claims, 16 Drawing Sheets

(56) References Cited

U.S. PATENT DOCUMENTS

| | | | |
|---|---|---|---|
| 2005/0174098 A1* | 8/2005 | Watanabe | H02M 3/07 323/282 |
| 2009/0207551 A1* | 8/2009 | Suzuki | H01B 3/12 361/301.4 |
| 2011/0234352 A1* | 9/2011 | MacLennan | H01F 27/08 336/61 |

* cited by examiner

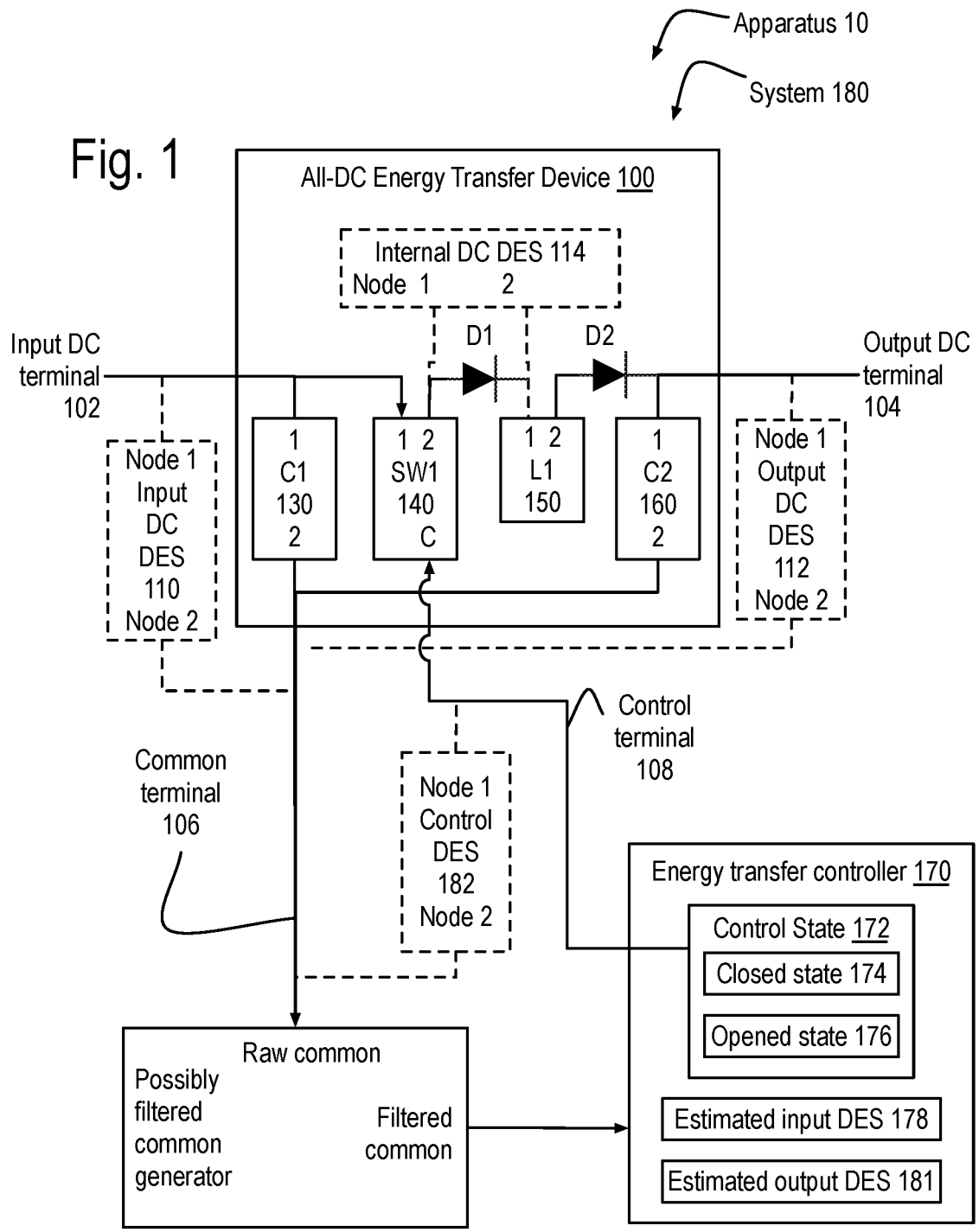

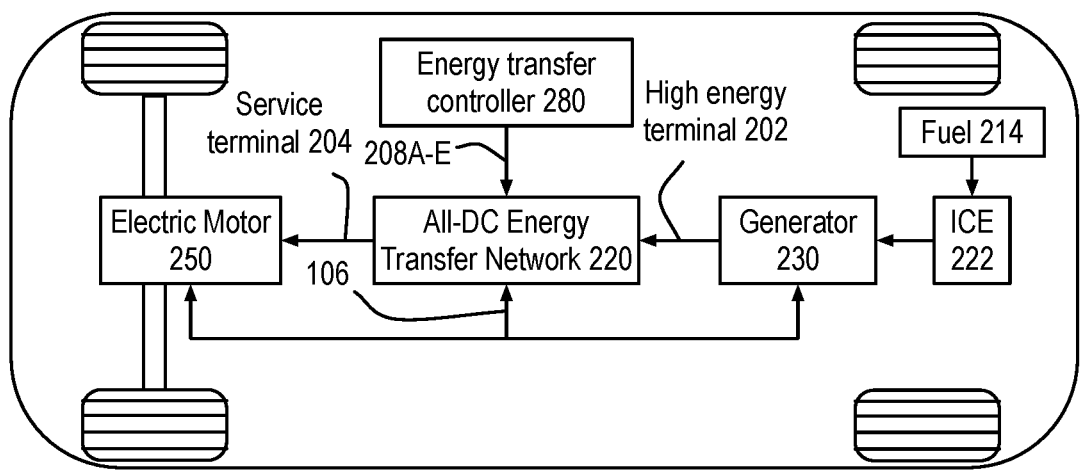
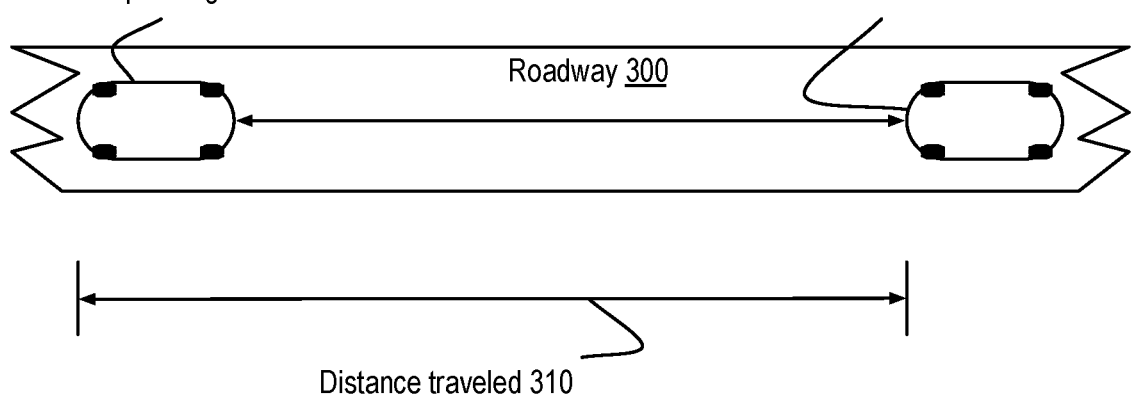

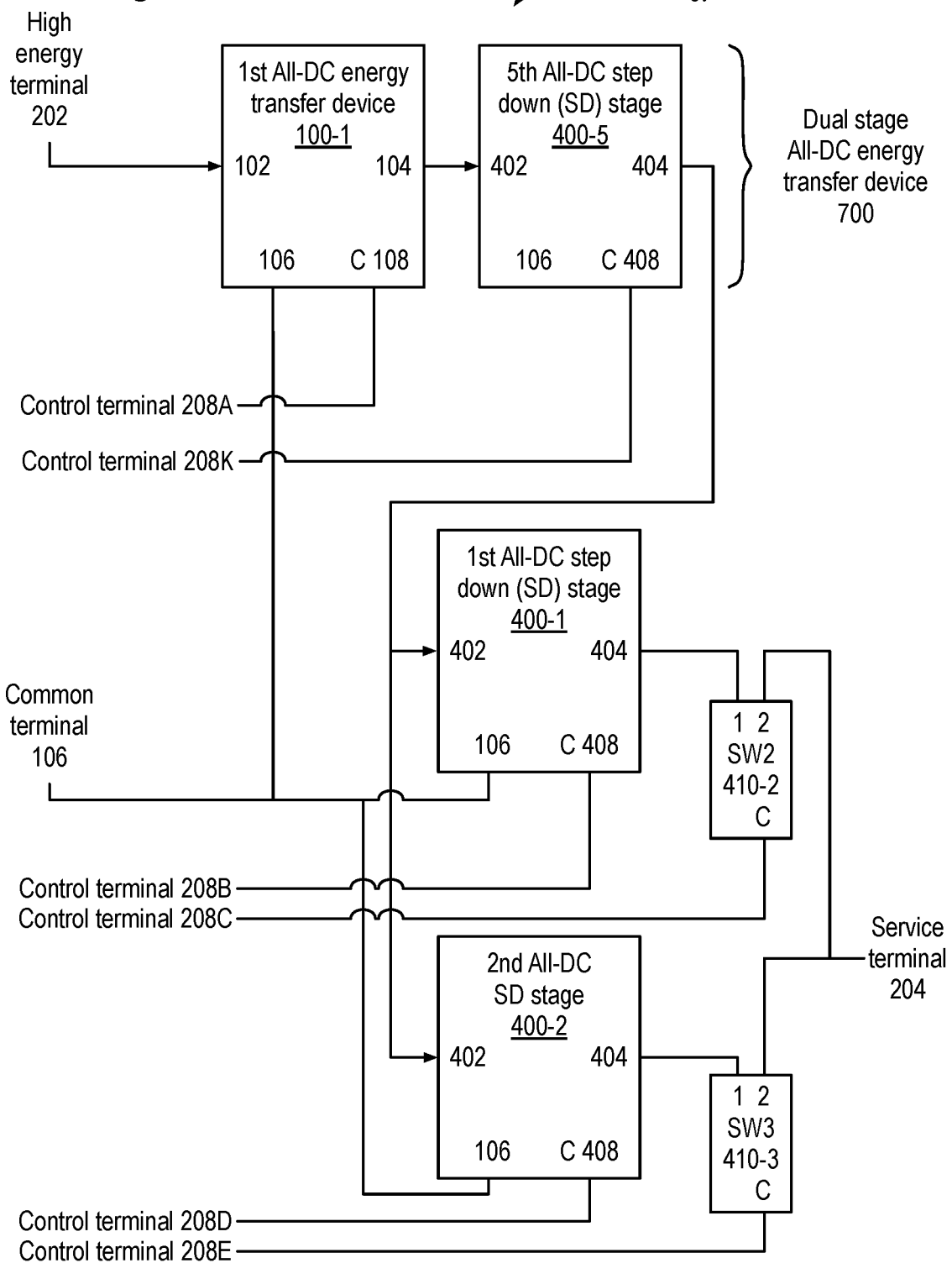

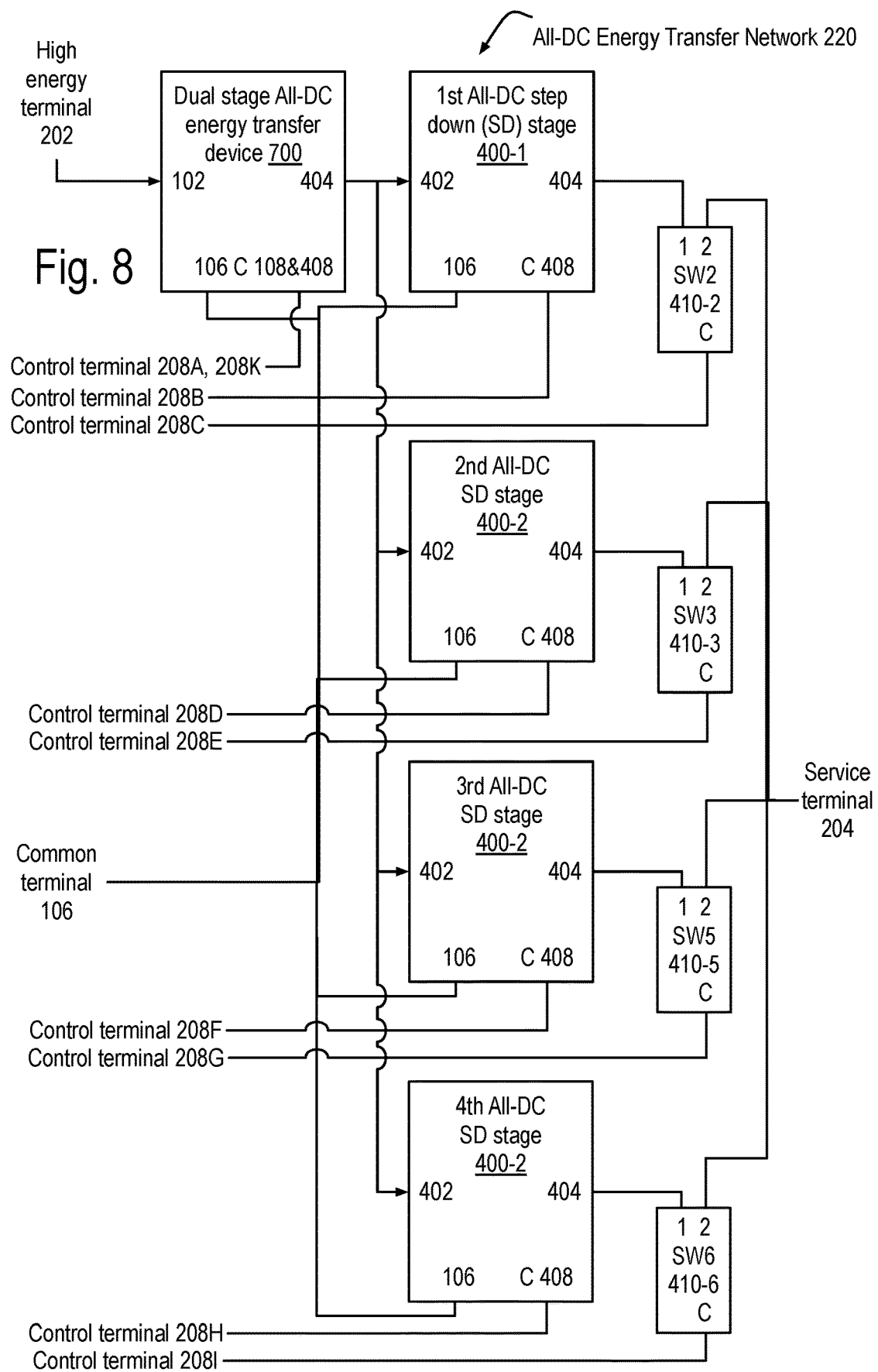

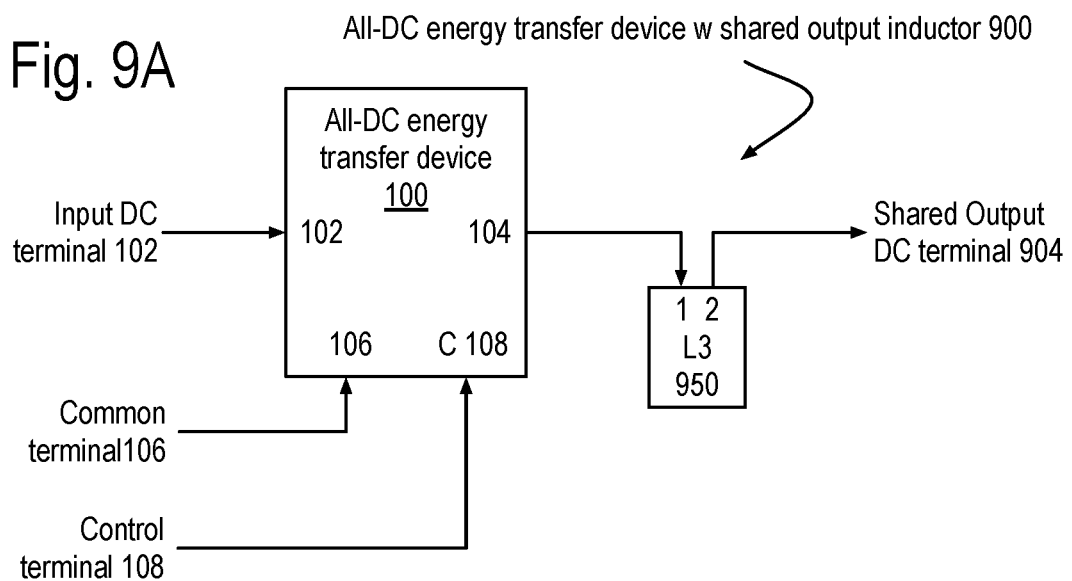
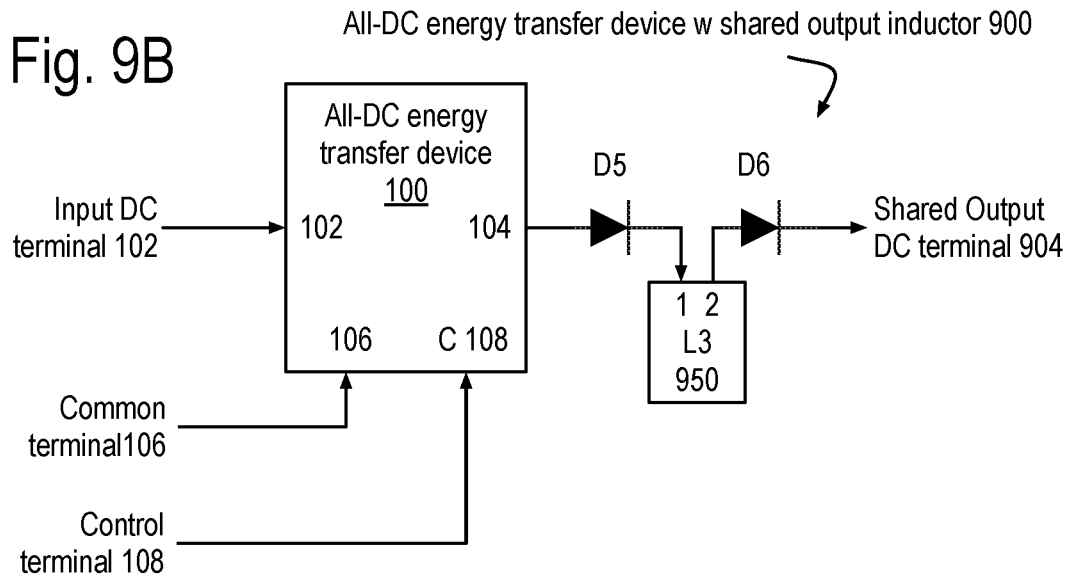

Fig. 18

Program component 1556

1600 Operate all-DC energy transfer device in response to sensing input DC terminal and/or output DC terminal with respect to common terminal 1610 Operate all-DC energy transfer network in response to sensing high energy terminal and/or service terminal with respect to common terminal 1620 Operate dual all-DC energy transfer device in response to sensing at least one of its terminals with respect to common terminal 1630 Operate at least one SD stage in response to sensing high energy terminal and/ or service terminal with respect to common terminal 1640 Operate at least one Cap stage in response to sensing high energy terminal and/ or service terminal with respect to common terminal 1650 Operate system in response to at least one sensed DES of at least one of all-DC energy transfer device and/or at least part of all-DC energy transfer network 1660 Operate hybrid electric/ICE auto in response to at least one sensed DES of at least part of all-DC energy transfer network

DC ENERGY TRANSFER APPARATUS, APPLICATIONS, COMPONENTS, AND METHODS

CROSS-REFERENCE TO RELATED APPLICATIONS

This application is a Divisional Application of U.S. patent application Ser. No. 15/644,623 entitled "DC Energy Transfer Apparatus, Applications, Components, and Methods," filed on Jul. 7, 2017, which is a Continuation Application of U.S. patent application Ser. No. 15/003,686, filed Jan. 21, 2016 (now U.S. Pat. No. 9,713,993), which is a Continuation Application of U.S. patent application Ser. No. 14/805,315, filed on Jul. 21, 2015 (now U.S. Pat. No. 9,287,701), which claims priority to U.S. Provisional Patent Application 62/194,748, filed on Jul. 20, 2015 and U.S. Provisional Patent Application 62/027,677, filed on Jul. 22, 2014.

TECHNICAL FIELD

This application discloses an all Direct Current (DC) energy transfer device, an energy transfer controller, an all-DC energy transfer network, components of use in such circuits, apparatus that benefits from including and/or using the all-DC energy transfer device and/or network and methods of operating the above in accord with this invention. The components may include, but are not limited to, at least one capacitive device, a switch device, and/or an inductive device, each of which are defined and disclosed in the summary and detailed disclosure. The application apparatus may include, but are not limited to, a hybrid electric vehicle, an electric vehicle, and/or a solar power device. The vehicles may be an automobile, a truck, a bus, a trolley, a train, an airplane, a ship, for surface and/or subsurface travel, a satellite, and/or a space vehicle. The preferred vehicles may be the automobile, the truck, or the bus. The vehicle may be manned or unmanned. The solar power devices may include, but are not limited to, energy transfer devices from solar power arrays and/or solar energy storage, whether these devices are on-grid or off-grid.

BACKGROUND OF THE INVENTION

Conversion of Direct Current (DC) energy from one voltage to another has been a standard function in many electrical and electronic systems since at least the beginning of the twentieth century.

As used herein a dynamical electro-state (DES) denotes one or more of a voltage, a current, or an inductance of at least one node with respect to a second node in a circuit. The voltage and/or the current may be determined by measurements between the node and the second node, which may vary over time. Inductance is discussed with regards to inductors. The current may be considered the rate of change over time of the electrical charge at the node flowing to the second node. The standard units in this document are for voltage the Volt (V), for current the Ampere (Amp), and for charge Coulomb (C). Voltage is considered synonymous with potential difference herein.

Circuits may often include, but are not limited to, devices including terminals, multiple nodes, electrical connections between some, but not all, of the terminals and/or some, but not all, of the nodes. The circuit, together with its included devices and electrical connections, forms multiple DES. Each of the DES may have an electro-state that may be shared across multiple nodes with respect to a solitary second node. In other situations one or more of the DES may have an electro-state that measurably changes from one node to another node with respect to the second node.

Some of the standard devices found in circuits include, but are not limited to, a capacitor, a resistor, an inductor, a diode and/or a switch. These standard devices will now be briefly discussed in terms of the prior art.

A capacitor is typically a two terminal device whose primary electrical property is its capacitance across its terminals. Capacitance is often seen as the ability of electrical charge, and therefore electrical energy, to be stored in the device. Capacitors are often modeled and/or built as two parallel conductive plates separated by a dielectric. The capacitance is usually modeled as directly proportional to the surface areas of the conductive plates and inversely proportional to the separation distance between the plates. Capacitance is further considered to be a function of the geometry of the plates and the permittivity of the dielectric. The unit of capacitance used herein is the Farad. A one Farad capacitor, charged with one Coulomb, is defined to have a potential difference of one volt between its plates. The usual model for capacitance is $C = e_r\, e_0\, A/d$, where C is the capacitance in Farads. A is the area of overlap of the parallel plates. $e_r$ is the permittivity of the dielectric. $e_0$ is the electric constant (roughly $8.854*10^{-12}$ F/meter), and d is the separation of the plates in meters. Energy is measured in Joules (J), and when stored in the capacitor, is usually defined as the work done to charge the capacitor to its current state. The energy stored in the capacitor is often estimated as $CV^2/2$ and reported in Joules.

An inductor is typically a two terminal device whose primary electromagnetic property is its inductance across its terminals. Inductors typically include a coil of conductive material often referred to as a wire. The wire connects the two terminals of the inductor. The wire between the terminals is often wound about an axis. In some situations, the windings are essentially symmetrical about the axis. The interior of the coil may or may not include a metallic core. Inductance is often defined as an electromagnetic property of the wire by which a change in current flowing through it induces a voltage (electromotive force), in both the wire itself (self-inductance), and in any nearby wires (mutual inductance). Inductance is often measured as the response by the coil to a time-varying, often sinusoidal, voltage of a given frequency applied across its terminals. The unit of inductance in this document is the Henry (symbolized H) a Standard International (SI) unit. Reduced to base SI units, one Henry is the equivalent of one kilogram meter squared per second squared per ampere squared ($kg_m^2\, s^{-2}\, A^{-2}$). It is common for inductors to be rated in Henries for a sinusoidal test pattern at a specified frequency, often one Kilo Herz.

A resistor is typically a two terminal device whose primary electrical property is its resistance across its terminals. Resistance is measured in units of the ohm, a SI unit. As used herein, the ohm is defined as the resistance between two nodes when a constant potential difference of one volt, applied to these nodes, produces a current of one ampere.

A diode is typically a two terminal device whose primary electrical property is that it blocks current flow from the first terminal to the second terminal, while it allows current flow from the second terminal to the first terminal with a pass resistance.

A switch refers to any one or more of the following: a mechanical switch, a solid-state switch, and/or a merged solid-state and mechanical switch. As used herein a switch includes a first and a second terminal and a control terminal. When the control terminal is in a closed state, the first and second terminals are connected, or closed. When the control terminal is in an open state, the first and second terminals are open, or unconnected.

A system may include one or more circuits and/or one or more devices. For example, an automobile is considered a system that may include a transmission circuit operated to aid in propelling the automobile and an air conditioning device operated to aid in climate control within a passenger compartment of the automobile.

A Direct Current (DC) DES refers herein to a DES whose current flows in just one direction between the node and the second node. An Alternating Current (AC) DES refers to a DES whose current flows both from the node to the second node and from the second node to the first node over time.

As used herein, an energy transfer device will refer to a circuit that includes an input DC terminal, an output DC terminal and a common terminal, and is adapted to receive a DC DES from the input DC terminal and to generate at least one output DC DES. The input DC DES has as its first node the input DC terminal. The output DC DES has as its first node the output DC terminal. Both input and output DC DES share the common terminal as their second node.

It has been conventional wisdom for several decades to favor energy transfer devices implemented as DC-to-DC converters. These DC-to-DC converters use an inverter responding to an AC timing DES to transform a DC input DES into an AC internal power DES that drives a primary coil of a transformer. The secondary coil(s) of the transformer generate at least one secondary AC DES. The secondary AC DES is then filtered and rectified to create the output DC DES of the DC-to-DC converter. Note that some or all of the AC DESes, particularly the secondary AC DES, are often implemented by a pair of wires.

SUMMARY OF THE INVENTION

This application discloses an all Direct Current (DC) energy transfer circuit, an energy transfer controller, an all-DC energy transfer network, components of use in such circuits, apparatus that benefits from including and/or using the energy transfer device and methods of operating the apparatus, the components and/or the apparatus in accord with this invention. As used herein a component of use in the invention's circuits may also be of use in other applications.

As used herein, the all-DC energy transfer device may include an input DC terminal, an output DC terminal and a common terminal, and through these terminals, receive an input DC DES from the input DC terminal and generate at least one output DC DES through the output DC terminal, with the common terminal acting as the second node for both of the DES. The all-DC energy transfer device includes at least one internal DES contributing to the generation of the output DC DES that consists essentially of a DC DES, referred to herein as the internal DC DES. The term internal DES refers to at least one node within the all-DC energy transfer device which is not one of the input terminals or output terminals used transfer most and possibly all of the energy between the input DC terminal and the output DC terminal.

This disclosure first discusses three basic implementations of the all-DC energy transfer device. The first implementation demonstrates the basic operations and performance of one embodiment of the invention. The second and third implementations can be used in a variety of applications, for example, in a hybrid electric/internal combustion engine (ice) automobile. Preferred embodiments of the second implementation of the all-DC energy transfer device may support that hybrid electric/ICE automobile sustaining a fuel usage of at least 100 miles per gallon, or in metric units, at least 43 kilometers per liter of a fuel such as gasoline. Preferred embodiments of the third implementation of the all-DC energy transfer device may support the hybrid electric/ice automobile sustaining fuel usage of at least 200 miles per gallon or at least 86 kilometers per liter. The second and third implementations of the all-DC energy transfer device may preferably be included in an all-DC energy transfer network used in apparatus such as the hybrid electric/ice automobile.

Returning to the all-DC energy transfer device, in some implementations, each of the internal DES of the DC energy transfer device can be further considered to be a predominantly DC DES. As used herein, a predominantly DC DES is one whose voltage and current may vary over time, but whose power spectrum in any short time window is concentrated in the DC or near 0 frequency component. As used herein, a short time window may have a duration of at least one of the following: 64 minutes, 32 minutes, 16 minutes, 8 minutes, 4 minutes, 2 minutes, 1 minute, 30 seconds, 15 seconds, 8 seconds, 4 seconds, 2 second, a second, 0.5 second, 0.25 second, 125 milliseconds (ms), 63 ms, 32 ms, or 16 ms.

In some implementations, the apparatus may include an energy transfer controller adapted to respond to the input DC DES and/or the output DC DES to generate at least one control DES received by the all-DC energy transfer device to direct its operation by responding to the control DES. The control DES(s) may represent Boolean logic values such as '0' and '1', which may be implemented in several different manners that are discussed in the detailed description.

The application apparatus may include, but are not limited to, a hybrid electric vehicle, an electric vehicle, and/or a solar power device. The vehicles may be an automobile, a truck, a bus, a trolley, a train, an airplane, a ship, for surface and/or subsurface travel, a satellite, and/or space vehicle. The preferred vehicles may be the automobile, the truck, or the bus. Any of the vehicles may be manned or unmanned. The solar power device may include, but is not limited to, a solar power cell and/or a solar energy store, whether these devices are on-grid or off-grid.

The components may include, but are not limited to, at least one of a capacitive device, a switch device, and/or an inductive device.

BRIEF DESCRIPTION OF THE DRAWINGS

FIG. 1 shows a simplified example relevant to the first three example implementations of a system including the all-DC energy transfer device and the energy transfer controller.

FIG. 2 shows the system of FIG. 1 using and including the all-DC energy transfer device and the energy transfer controller to implement a vehicle in accord with this invention, in particular a hybrid electric and internal combustion engine (ice) automobile.

FIG. 3 shows the vehicle and/or automobile of FIG. 2 supplied with a unit of fuel on the right hand side of a roadway traveling a distance thereby expending the unit of fuel.

FIGS. 4 to 12 show some details of the All-DC energy transfer network of FIG. 2 adapted to transfer energy within the vehicle and/or hybrid electrical-ice automobile supporting the second and/or third implementations of the all-DC energy transfer device of FIG. 1.

FIG. 18 shows some examples of the program component of FIG. 17, any of which may implement at least one component of a method of operating and/or using at least part of at least one of the all-DC energy transfer device, the all-DC energy transfer network, and/or the system, in particular the hybrid electric/ICE automobile.

DETAILED DESCRIPTION OF THE DRAWINGS

Figure 4:
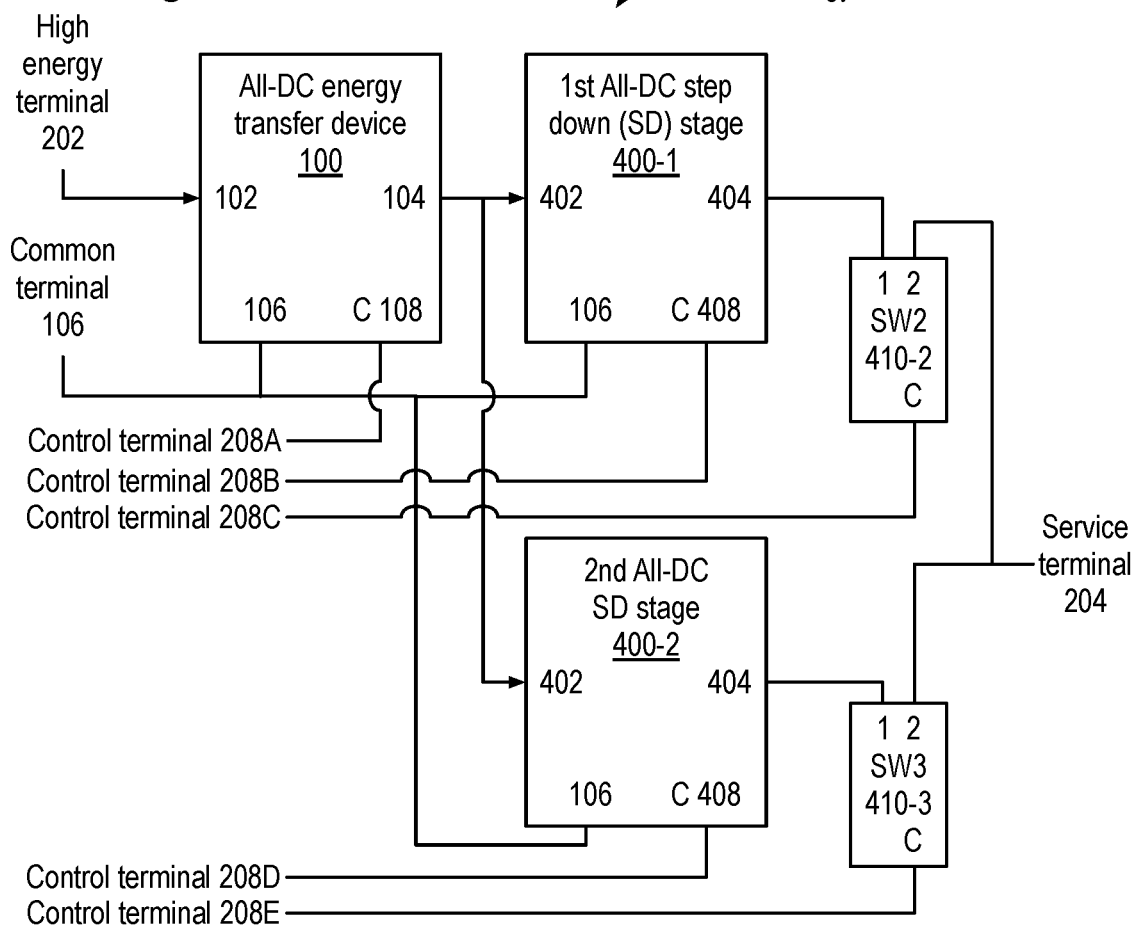

This application discloses an all Direct Current (DC) energy transfer circuit, an energy transfer controller, an all-DC energy transfer network, components of use in such circuits, apparatus that benefit from including and/or using the all-DC energy transfer device and methods of operating the above in accord with this invention. This detailed description begins by defining some terms of potential relevance to the interpretation of the claims and to the exposition of the enablement of such claims by this specification. Three basic implementations of the all-DC energy transfer device are discussed. Also included, the details of various combinations and alternatives of the invention are disclosed.

Defining some terms: In the Summary of the Invention above, this Detailed Description of the Invention, the claims below, and the accompanying drawings, reference is made to particular features of the invention. These features can for example be components, ingredients, elements, devices, apparatus, systems, groups, ranges, method steps, test results and instructions, including program instructions.

It is to be understood that the disclosure of the invention in this specification includes all possible combinations of such particular features. For example, where a particular feature is disclosed in the context of a particular aspect, a particular embodiment, a particular claim, or a particular Figure, that feature can also be used in combination with other particular aspects, embodiments, claims and Figures, and in the invention generally, except where the context excludes that possibility.

The invention disclosed herein, and the claims, include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The terms "includes" and "contains" are similarly interpreted.

The term "consisting essentially of" and grammatical equivalents thereof is used herein to mean that, in addition to the features specifically identified, other features may be present which do not materially alter the claimed invention.

The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%.

The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)–(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility.

Where reference is made herein to "first" and "second" features, this is generally done for identification purposes; unless the context requires otherwise, the first and second features can be the same or different, and reference to a first feature does not mean that a second feature is necessarily present (though it may be present).

Where reference is made herein to "a" or "an" feature, this includes the possibility that there are two or more such features (except where the context excludes that possibility). Thus there may be a single such feature or a plurality of such features. Where reference is made herein to two or more features, this includes the possibility that the two or more features are replaced by a lesser number or greater number of features which provide the same function, except where the context excludes that possibility.

The numbers given herein should be construed with the latitude appropriate to their context and expression; for example, each number is subject to variation which depends on the accuracy with which it can be measured by methods conventionally used by those skilled in the art at the date of filing of this specification.

The term "and/or" is used herein to mean the presence of either or both of the two possibilities stated before and after "and/or". The possibilities can for example be components, ingredients, elements, devices, apparatus, systems, groups, ranges and steps. For example "item A and/or item B" discloses three possibilities, namely (1) only item A is present, (2) only item B is present, and (3) both item A and item B are present. Similarly, A, B and/or C will be interpreted to mean (A and/or B) and/or C which is deemed, unless otherwise stated, as equivalent to A and/or (B and/or C).

If any element in a claim of this specification is considered to be, under the provisions of 35 USC 112, an element in a claim for a combination which is expressed as a means or step for performing a specified function without the recital in the claim of structure, material, or acts in support thereof, and is, therefore, construed to cover the corresponding structure, material, or acts described in the specification and equivalents thereof, then the corresponding structure, material, or acts in question include not only the corresponding structure, material, or acts explicitly described in the specification and the equivalents of such structure, material, or acts, but also such structure, material, or acts described in the US patent documents incorporated by reference herein and the equivalents of such structure, material, or acts. Similarly, if any element (although not specifically using the term "means") in a claim of this application is correctly construed as equivalent to the term means or step for performing a specified function without the recital in the claim of structure, material, or acts in support thereof, then the corresponding structure, material, or acts in question include not only the corresponding structure, material, or acts explicitly described in the specification and the equivalents of such structure, material, or acts, but also such structure, material, or acts described in the US patent documents incorporated by reference herein and the equivalents of such structure, material, or acts.

This specification incorporates by reference all documents referred to herein by an application data sheet and all documents filed concurrently with this specification or filed previously in connection with this application, including but not limited to such documents that are open to public inspection with this specification.

The first three implementations of the all-DC energy transfer device may be summarized as follows: The first implementation demonstrates the basic operations and performance of one embodiment of the invention. The second and third implementations can be used in a variety of applications, for example, in a hybrid electric/internal combustion engine (ice) automobile. A preferred embodiment of the second implementation of the all-DC energy transfer device may support hybrid electric/ice automobile sustaining a fuel usage of at least 100 mile per gallon, or in metric units, at least 43 kilometers per liter of a fuel such as gasoline. A preferred embodiment of the third implementation of the all-DC energy transfer device may support the hybrid electric/ice automobile sustaining fuel usage of at least 200 miles per gallon or at least 86 kilometers per liter.

FIG. 1 shows a simplified example relevant to the first three example implementations of a system 180 including the all-DC energy transfer device 100 and the energy transfer controller 170.

In its simplest form, the all-DC energy transfer device 100 includes an input DC terminal 102, an output DC terminal 104 and a common terminal 106, as mentioned in the definition of a energy transfer device above. The all-DC energy transfer device 100 is adapted to respond to the input DC DES 110 at the input DC terminal 102 to transfer electrical energy through at least one internal DES 114 to an output DC DES 112 at the output DC terminal 104; each of the internal DES 114 consist essentially of a DC DES. Recall that by definition, a DC DES is adapted to flow current in only one direction. In this example, the internal DC DES 114 has its first node 1 is connected to the second terminal 2 of the switch SW1 140 and its second node 2 is connected to the first terminal 1 of the inductor L1 150.

The all-DC energy transfer device 100 may include a first capacitive device C1 130, a second capacitive device C2 160, a switch SW1 140 and an inductive device L1 150. The first capacitive device C1 130, the second capacitive device C2 160, the switch SW1 140 and the inductive device L1 150 each include a first terminal 1 and a second terminal 2. The switch SW1 140 further includes a control terminal C. The switch SW1 130 is adapted to close a connection between the first terminal 1 and the second terminal 2 of the switch in a closed state 174 and to open the connection in a opened state 176, wherein the closed state and the opened state may be provided via a control terminal 108 as the response to a control DES 182 of the control terminal (as node 1) with respect to the common terminal as node 2.

In some implementations, the all-DC energy transfer device 100 further includes the following.

The input DC terminal 102 is connected to the first terminal 1 of the first capacitive device C1 130 and connected to the first terminal 1 of the switch SW1 140.

The second terminal 2 of the first capacitive device C1 130 is connected to the common terminal 106.

The second terminal 2 of the switch SW1 140 is connected to the first terminal 1 of the inductive device L1 150.

The second terminal 2 of the inductive device L1 150 connected to the first terminal 1 of the second capacitive device C2 160 and to the output DC terminal 104.

The second terminal 2 of the second capacitive device C2 160 is connected to the common terminal 106.

FIG. 1 also shows the energy transfer controller 170 adapted to operate the all-DC energy transfer device 100 in response to sensing the input DC DES 110 and/or the output DC DES 112 by generating the control DES 182 to provide the closed state 174 or the opened state 176 to the switch SW1 140 via the control terminal 108. The energy transfer controller 170 may also include an estimated input DES 178 and/or an estimated output DES 181 in some implementations.

In some implementations, the DC energy transfer device may include the energy transfer controller adapted to respond to the input DC DES and at least the output DC DES to generate at least one control DES received by the all-DC energy transfer device to direct its configuration. The DC energy transfer device is adapted to respond the control DES to configure its operation. The control DES(s) may represent Boolean logic values such as '0' and '1', which may be implemented in several different manners.

For example, it is common practice to implement these Boolean values as two non-overlapping voltage ranges, for instance, '0' may represent a voltage range from 0 to 1 volts and '1' a voltage range from 2 to 3.4 volts. For another example, it is also common practice to represent '0' as a negative range, such as −1.5 up to −0.75 Volts, and '1' as a positive voltage range such as 0.75 up to 1.5 Volts. This sort of signaling is sometimes referred to as differential signaling.

One skilled in the art will recognize that such control DES conventions do not affect the internal DES of the all-DC energy transfer device, whether there are one or more of the internal DES.

FIG. 1 also shows that in some implementations of the system 180, the common terminal 106 is connected to a possibly filter common generator that may further provide a filtered common to the energy transfer controller 170. The filtered common may be provided to protect the energy transfer controller 170 from noise that the power circuitry of the all-DC energy transfer device 100 may be immune to.

Three implementations of the all-DC energy transfer device 100 will now be discussed. The first implementation demonstrates a test circuit system 180 as shown in FIG. 1, the connection between the second terminal 2 of the switch SW1 140 to the first terminal 1 of the inductive device L1 150 further included a first diode D1. The connection between second terminal 2 of the inductor L1 150 and the first terminal 1 of the second capacitor C2 160 further includes a second diode D2. The diodes D1 and D2 attenuate possible undershoots from the opening and closing of the switch SW1 140, to further insure that the internal DES 114 is essentially a DC DES, because these diodes insure that the current flows in just one direction.

The capacitors used in the capacitive devices C1 and C2 were all rated at 1800 micro ($10^{-6}$) Farads at 450 volts. However, testing each of these capacitors showed their individual capacitances in the range of 1600 micro Farads. They were tested with a resistance, capacitance and inductance (RCL) meter. Each of these capacitors was labeled with its measured capacitance.

The first capacitive device C1 130 was made using three of the capacitors arrange in series to support a working voltage of up to 1000 volts, with a capacitance of 530.76 micro Farad.

The second capacitive device C2 160 was tested in several parallel arrangements of the capacitors, numbering from one to five of the capacitors in parallel with a collective capacitance of approximately 1600 micro Farad.

The switch SW1 140 was a mechanical switch adapted to operate at better than 1000V and capable of handling the current of the all-DC energy transfer device 100.

To summarize these tests, the input DC DES was measured as 40 volts. The output DC DES was about 15.65 volts. The energy transferred was 0.2379 Joules from the first capacitive device C1 130 to the second capacitive device C2. The efficiency of the energy transfer was estimated as about 83.34%. As a consequence, the all-DC energy transfer device may have an energy transfer efficiency of at least K %, where K is at least 65, further K may be at least 75%, further K may be at least 83, based upon the inventor's experimental evidence.

Initial testing was performed to establish a baseline. DC metrology grade meters were used to make the various voltage measurements to units of $10^{-6}$ Joule. Recordings were made to 4 decimal significant figures for the most part. These instruments were calibrated with both an in-house standard and comparative voltage readings from a recently acquired instrument that was set up to the maker's technical specifications by the seller's certified calibration laboratory.

FIG. 2 shows the system 180 of FIG. 1 using and including the all-DC energy transfer device 100 and the energy transfer controller 170 to implement a vehicle 200 in accord with this invention, in particular a hybrid electric and internal combustion engine (ice) automobile 210. This automobile 210 includes the elements of the system 180 of FIG. 1, as well as fuel 214 controllable feeding the ICE 222. The ICE 222 is operated to provide energy to a generator 230 whose electrical output is supplied to the input DC terminal 102 of the all-DC energy transfer device 100. In this simplified schematic portrayal, the output DC terminal 104 is connected to an electric motor 250 that drives one or more axles to turn the wheels of the automobile.

FIG. 3 shows the vehicle 220 and/or automobile 210 of FIG. 2 supplied with a unit of fuel 214 on the right hand side of a roadway 330. The vehicle 200 and/or automobile 210 travels as show by the arrow from the right to the left side of the drawing, where the vehicle 220 and/or automobile 210 is shown after expending the unit of the fuel 214 and traveling a distance 310.

The second implementation adapts the energy transfer device 100 in an all-DC energy transfer network 220 to operate in the hybrid electric/internal combustion engine (ice) automobile 210 to support that automobile sustaining a fuel usage of at least 100 mile per gallon, or in metric units, at least 43 kilometers per liter of a fuel such as gasoline. Put another way, when the unit 320 is one gallon, the expected distance traveled is over 100 miles. When the unit 320 is one liter, the expected distance traveled is over 43 kilometers.

The third implementation adapts the energy transfer device 100 in an all-DC energy transfer network 220 to operate in the automobile 210 to sustaining fuel usage of at least 200 miles per gallon or at least 86 kilometers per liter. Put another way, when the unit 320 is one gallon, the expected distance traveled is over 200 miles. When the unit 320 is one liter, the expected distance traveled is over 86 kilometers.

FIGS. 4 to 11 show some details of the All-DC energy transfer network 220 of FIG. 2 adapted to transfer energy within the vehicle 200 and/or hybrid electrical-ice automobile 210 of FIG. 2 supporting the second and/or third implementations of the all-DC energy transfer device 100 of FIG. 1. These Figures will first be discussed individually, and then discussions will be made about them collectively supporting the second and/or the third implementations.

Figure 5:
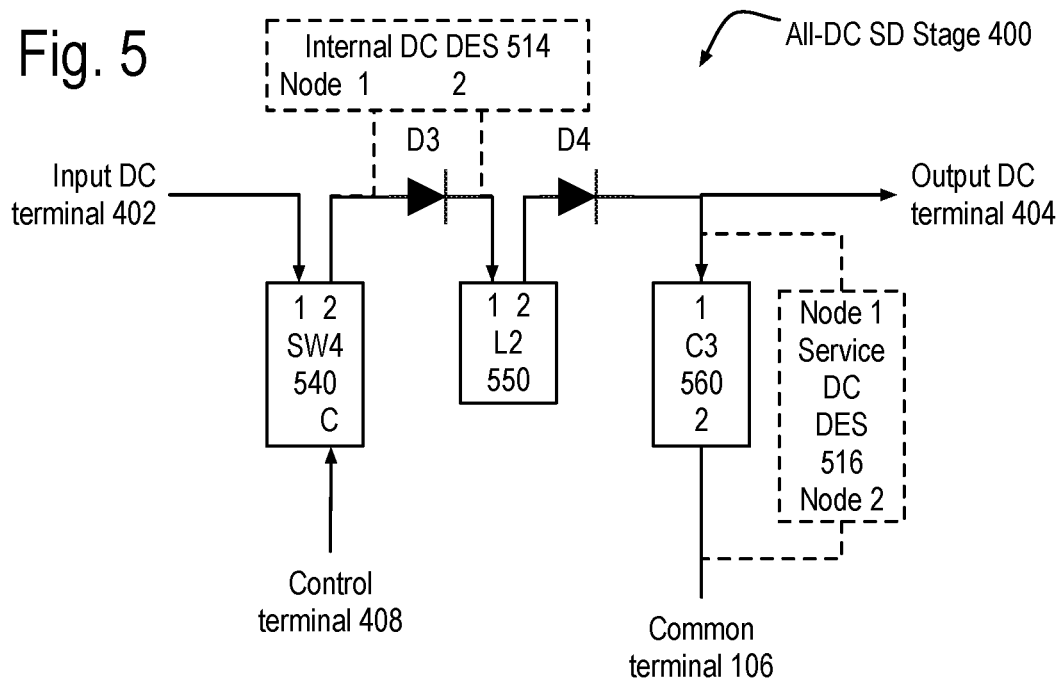

FIG. 4 shows the all-DC energy transfer network 220 of FIG. 2 including the all-DC energy transfer device 100 of FIG. 1 and two instances of an all-DC step down (SD) stage 400-1 and 400-2, which are shown in further detail in FIG. 5. The all-DC energy transfer network 220 may include a high energy terminal 202, a common terminal 106, and a service terminal 204 as first shown in FIG. 2. The all-DC energy transfer network 220 may also include multiple control terminals labeled 208A to 208E, also first shown in FIG. 2.

In FIG. 4, the control DES at each of the control terminals 208A to 208E with respect to the common terminal 106 will be discussed in terms of opening or closing a switch in the relevant component.

For example, control DES A being 'closed' refers to the control terminal 208A being provided the conditions to open the switch SW1 140 inside the all-DC energy transfer device 100 as shown in FIG. 1.

Another example, the control DES B being 'open' refers to the control terminal 208B being provided the conditions to open the switch SW 4 540 in the first all-DC step down stage 400, as shown in FIG. 5.

A third example, the control DES C being 'closed' refers to control terminal 208C being provided the conditions to close the switch SW2 410-2.

FIG. 5 shows some details of one or more of the instances of the all-DC Step Down (SD) stages 400-1 and/or 400-2 of FIG. 4. Each of the all-DC SD stages include the input DC terminal 402, the output DC terminal 404, the control terminal 408, and the common terminal 106 as first shown in FIG. 4. The all-DC SD stage further includes a switch SW4 540, a second inductor L2 550 and a third capacitive device C3 560.

For the purpose of simplifying the discussion and analysis of FIGS. 4 to 11, control DES for the controls terminals 208C and 209E will be assumed to never both be closed at the same time. This will allow the analysis of the DES conditions at the service terminal 204 in FIG. 2 to proceed under the assumption that these conditions can be addressed by the energy stored in the third capacitive device C3 560 as shown in FIG. 5. While this simplification is helpful in understanding the operation and analysis of the invention, it does not preclude the energy transfer controller 280 of FIG. 2 from operating these control DES in any combination that are found useful.

Figure 6:
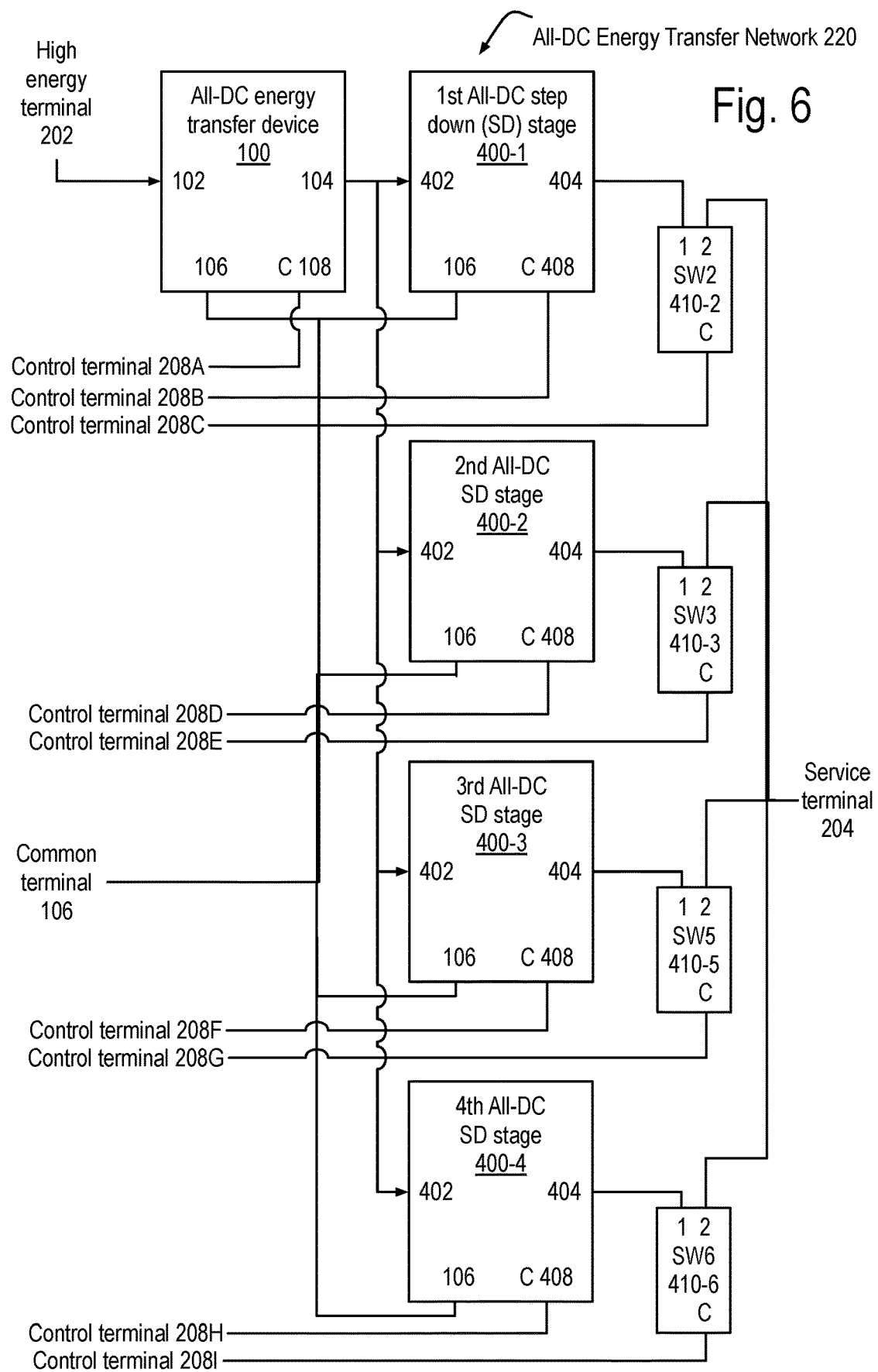

FIG. 6 shows a refinement of the all-DC energy transfer network 220 of FIG. 4, now including a third and fourth all-DC SD stages 400-3 and 400-4. This all-DC energy transfer network 220 also includes four additional control terminals 208F to 208I. Similar to the previous discussion, at most one of the switches SW2 410-2, SW3 410-3, SW4 410-6 or SW5 410-7, are closed at anytime. While this simplification is helpful in understanding the operation and analysis of the invention, it does not preclude the energy transfer controller 280 of FIG. 2 from operating these control DES in any combination that are found useful. However, the control DES associated with the control terminal C 408 of the 4 instances of the all-DC SD stages 400-1 to 400-4, may or may not be 'closed' at the same time. Closing two of these internal switches in the all-DC SD stages allows two of the third capacitive devices C3 560 of FIG. 5 to be charged at the same time, while each of these capacitive devices is discharged separately may be useful, particularly regarding the third implementation.

FIG. 7 shows a refinement to FIG. 4, where the all-DC energy transfer network 220 further includes a fifth all-DC SD stage 400-5. The dual stage all-DC energy transfer device 700 includes the first all-DC energy transfer device 100-1 and the fifth all-DC step down (SD) stage 400-5. The terminals of the dual stage all-DC energy transfer device 700 include (as before) the input DC terminal 102 and the common terminal 106. To avoid confusion, the output terminal is labeled 404 to be consistent with this Figure. The output DC terminal 104 of the first all-DC energy transfer device 100-1 is connected to the input DC terminal 402 of the fifth instance of the all-DC step down (SD) stage as shown. The dual stage all-DC energy transfer device 700 supports a two stage step down an intermediate voltage in the fifth instance thereby reducing the requirements in some implementations on the service DES of the regular first through fourth instances of the all-DC step down stages previously shown and as implemented by the first and second all-DC SD stages 400-1 and 400-2 of this Figure.

FIG. 8 shows a refinement to the all-DC energy transfer network 220 of FIG. 6 by replacing the first all-DC energy transfer device 100-1 with the dual stage energy transfer device 700. This replacement leads to similar potential advantages as discussed regarding FIG. 7 combined with the potential advantages regarding FIG. 6, as discussed above.

Figure 9C:
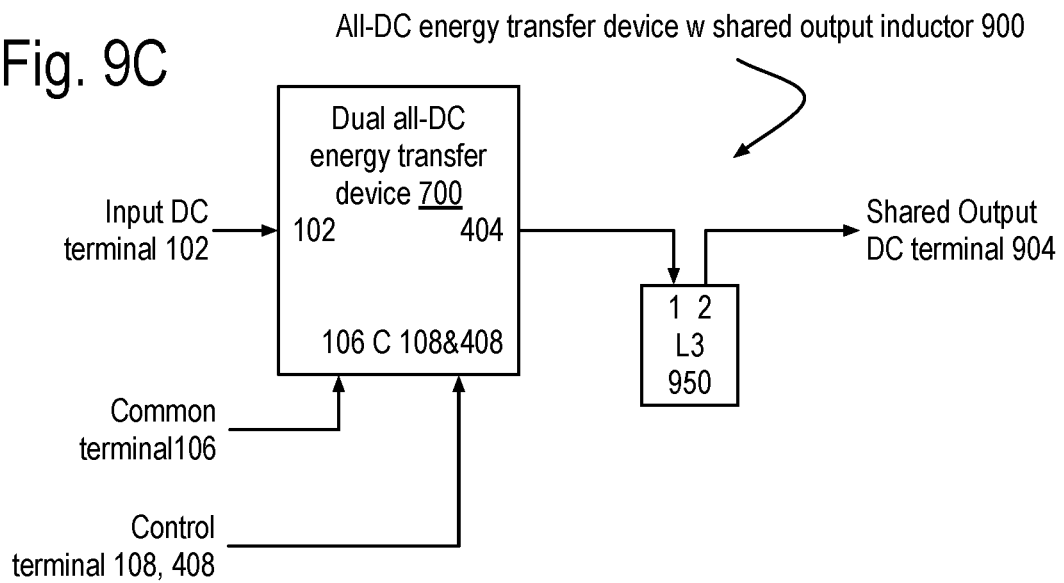

FIG. 9A to FIG. 9C show four potential implementations of an all-DC energy transfer device 900 with a shared output inductor L3 950.

In FIG. 9A and FIG. 9B, the all-DC energy transfer device with shared inductor 900 includes an instance of the all-DC energy transfer device 100.

In FIG. 9A, the output DC terminal 104 of the all-DC energy transfer device 100 is connected to the first terminal 1 of a third inductive device L3 950. The second terminal 2 of the third inductive device L3 950 is connected to a shared output DC terminal 904.

In FIG. 9B, the output DC terminal 104 of the all-DC energy transfer device 100 is connected through a fifth diode D5 to the first terminal 1 of a third inductive device L3 950. The second terminal 2 of the third inductive device L3 950 is connected through a sixth diode D6 to a shared output DC terminal 904.

Figure 9D:
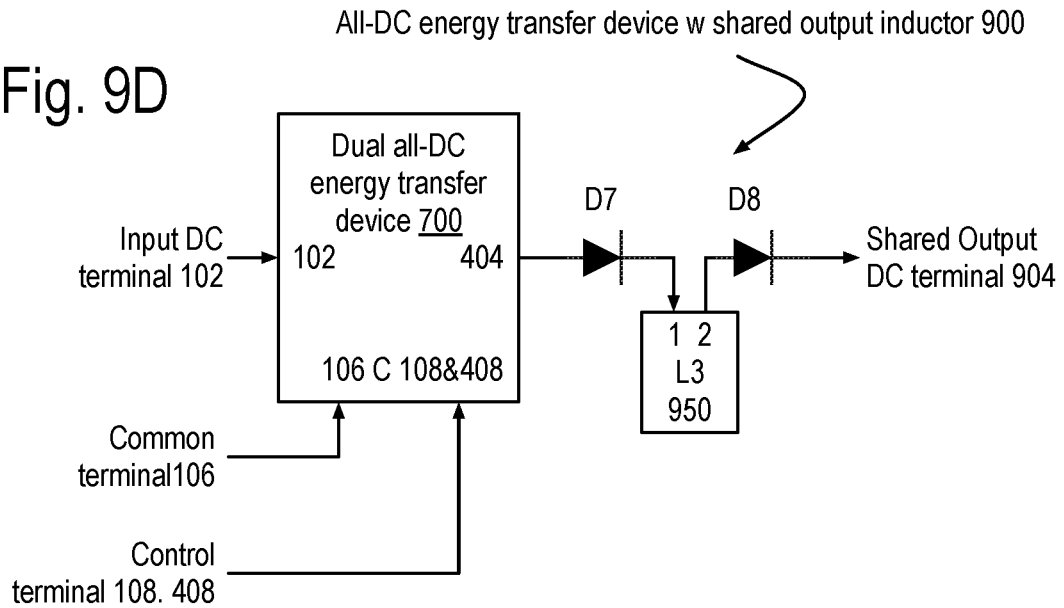

In FIG. 9C and FIG. 9D, the all-DC energy transfer device with shared inductor 900 includes an instance of dual all-DC energy transfer device 700.

In FIG. 9C, the output DC terminal 404 of the dual all-DC energy transfer device 700 is connected to the first terminal 1 of a third inductive device L3 950. The second terminal 2 of the third inductive device L3 950 is connected to a shared output DC terminal 904.

In FIG. 9D, the output DC terminal 104 of the dual all-DC energy transfer device 700 is connected through a seventh diode D7 to the first terminal 1 of a third inductive device L3 950. The second terminal 2 of the third inductive device L3 950 is connected through a eighth diode D8 to a shared output DC terminal 904.

Figure 10:
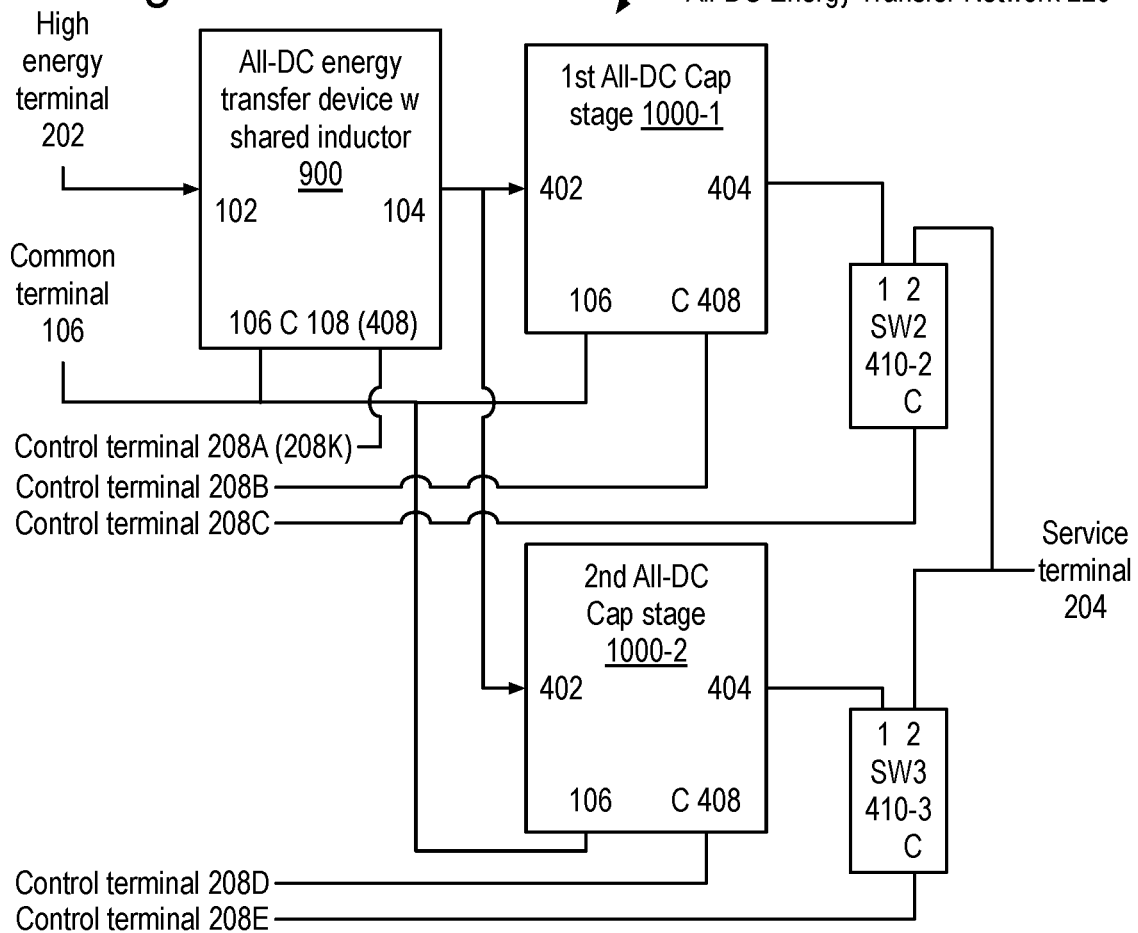
Figure 11:
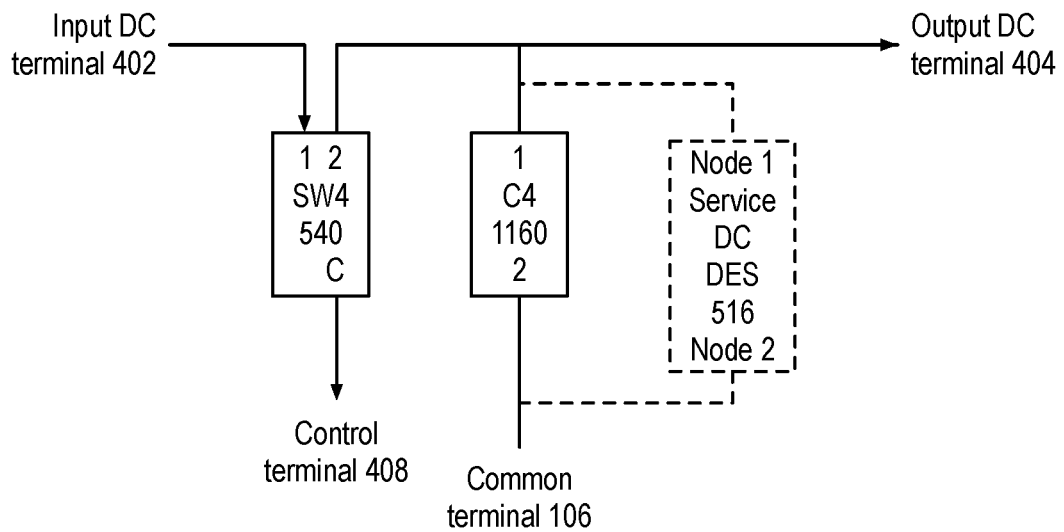

FIG. 10 shows an implementation of the all-DC energy transfer network 220 of previous Figures including an all-DC energy transfer device with shared inductor 900, two instances of an all-DC capacitance stage 1000-1 and 1000-2, and two switches SW2 410-2 and SW3 410-3. By sharing the third inductor L3 950 as shown in FIG. 9A to FIG. 9D, the all-DC Capacitance Stages 1000-1 and 1000-2 do not need inductors, as shown in FIG. 11. This implementation may be useful in some implementations of the all-DC energy transfer network 220.

FIG. 11 shows an example of the all-DC capacitance stage in accord with the all-DC energy transfer device with shared inductor 900 shown in FIG. 9A to FIG. 9D.

Figure 12:
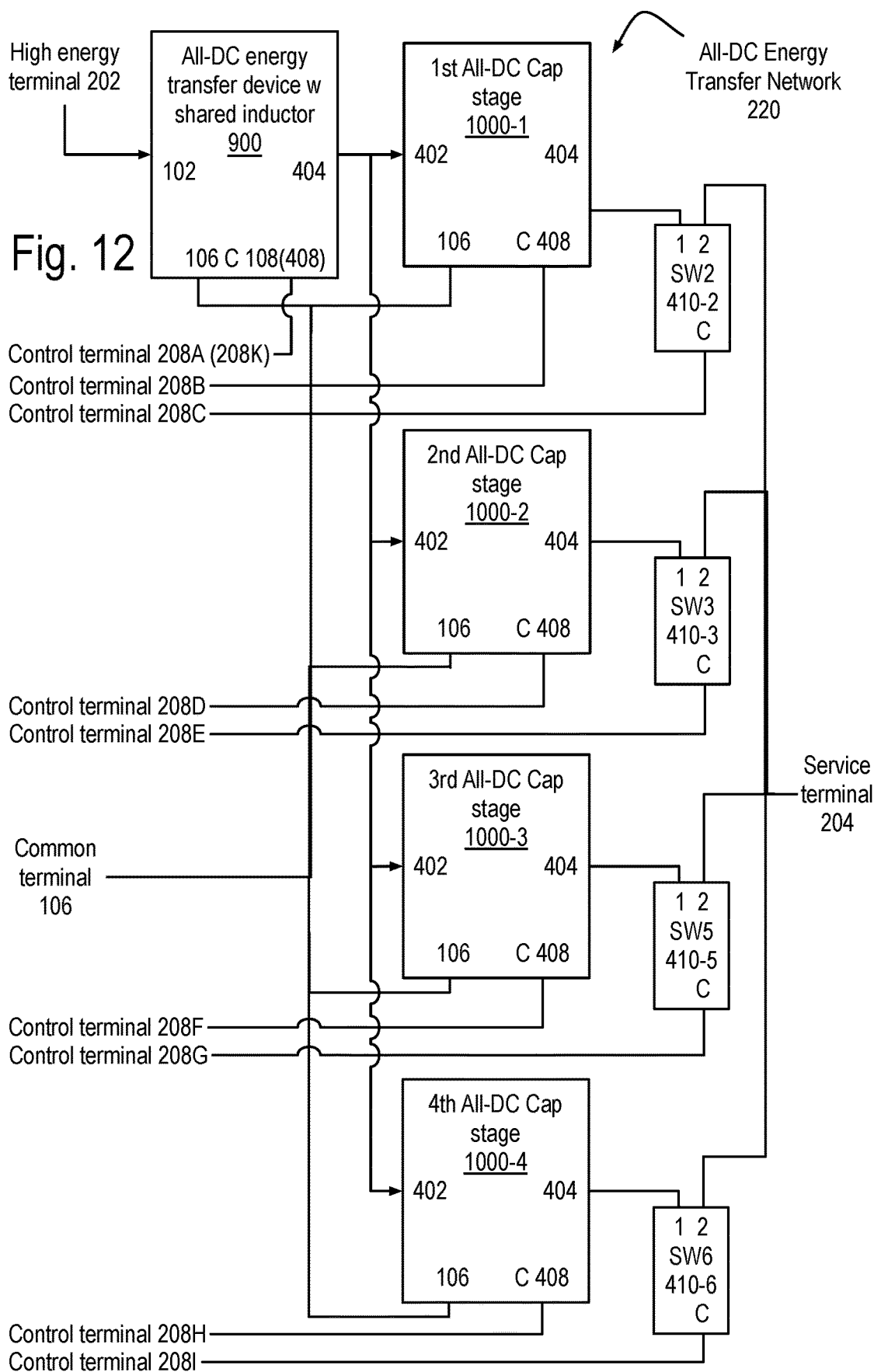

FIG. 12 refines the all-DC energy transfer network 220 of FIG. 10 to further include a third and fourth instance of the all-DC capacitance stage 1000-3 and 100-4.

Assume the following about early adaptations of the hybrid electric-ice automobile 210 of FIGS. 2 and 3. The automobile 210 weighs about 3,000 pounds or about 1361 kilograms. The electric motor 250 will need something close to a continuous transfer of 50 kilo-watts of electrical power to sustain the automobile 210 operating within normal usage, such as being able to cruise at 70 miles per hour and to climb a 5% grade at 55 miles per hour. The automobile 210 will repeatedly cycle through charging the all-DC energy transfer network 220 by turning on the internal combustion engine (ICE) 222 to run the generator 230 to generate the energy presented through the high energy terminal 204 into the all-DC energy transfer network 220. Turning on the ICE 222 will expend fuel 214 charging the all-DC energy transfer network 220 to sustain providing the electric motor 250 with electrical power through the service terminal 204.

Figure 13:
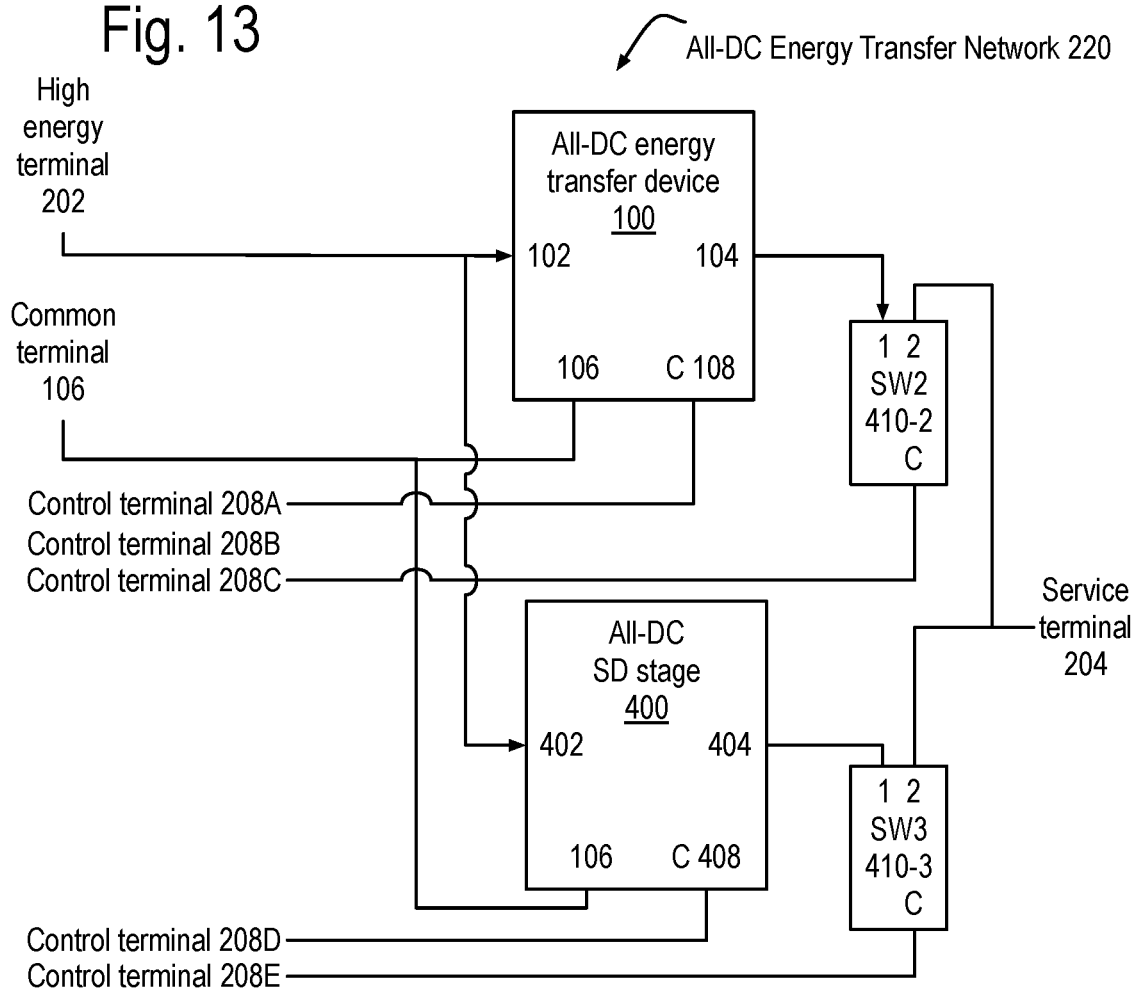
FIG. 13 shows of the all-DC energy transfer network including the all-DC energy transfer device and an all-DC step down (SD) stage, can be of advantage in having only one step down stage being operated at any one time for the entire network.

FIG. 13 shows of the all-DC energy transfer network 220 including the all-DC energy transfer device 100 and an all-DC step down (SD) stage 400, where the input DC terminal 402 of all-DC SD stage 400 is connected to the high energy terminal 202, effectively sharing the energy stored in the first capacitive device C1 130 of FIG. 1 with the first terminal 1 of the fourth switch SW4 of FIG. 5. This network 220 can be of advantage in having only one step down stage being operated at any one time for the entire network.

Figure 14:
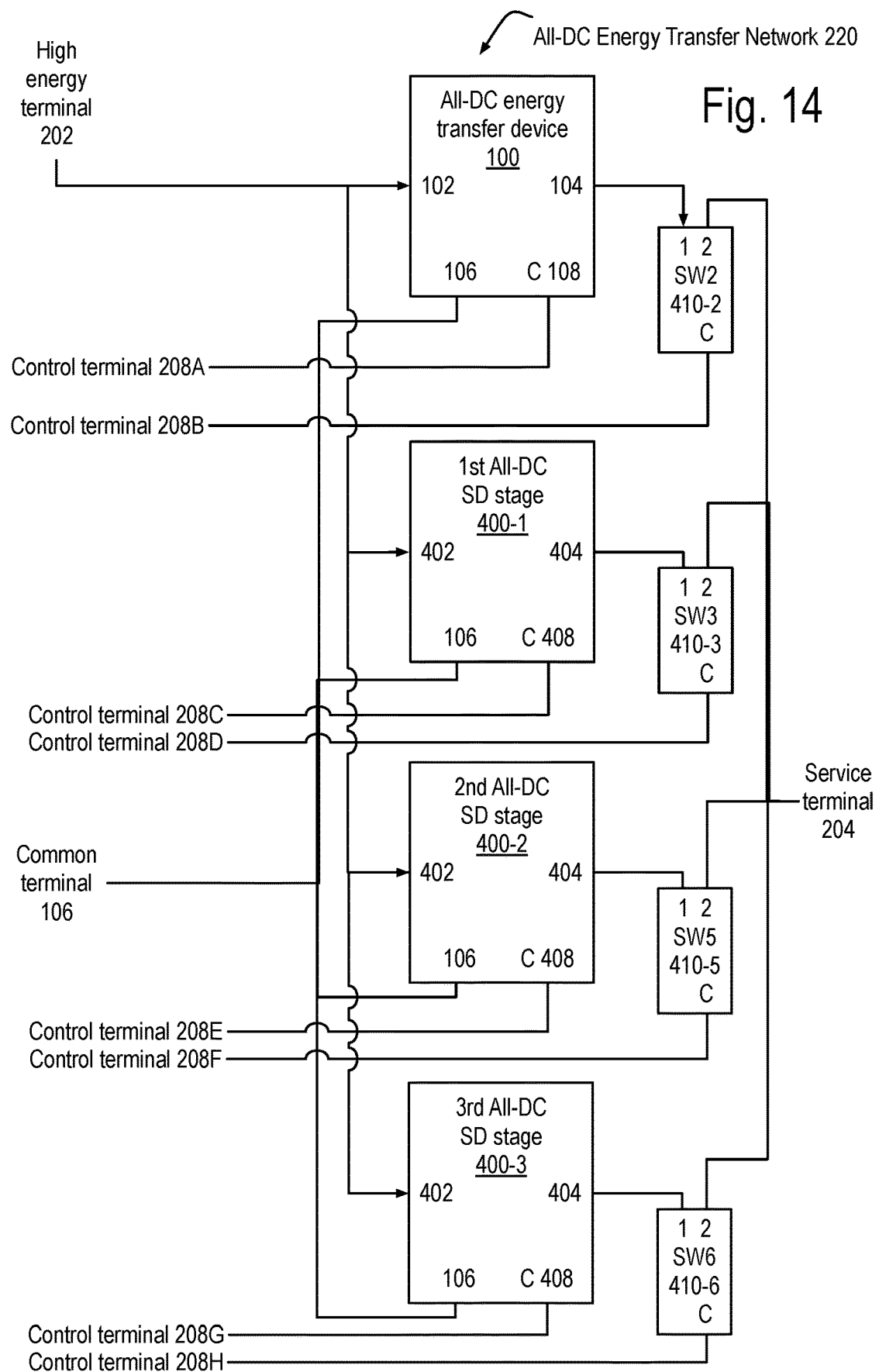
FIG. 14 shows of the all-DC energy transfer network including the all-DC energy transfer device and 3 instances of all-DC SD stage can be of advantage in having only one step down stage being operated at any one time for the entire network.

FIG. 14 shows of the all-DC energy transfer network 220 including the all-DC energy transfer device 100 and 3 instances of all-DC step down (SD) stage 400-1, 400-2 and 400-3, where the input DC terminal 402 of each of the all-DC SD stages 400-1, 400-2 and 400-3 are connected to the high energy terminal 202, effectively sharing the energy stored in the first capacitive device C1 130 of FIG. 1 with the first terminal 1 of the fourth switch SW4 of FIG. 5 in each instance of the all-DC SD stage 400-1, 400-2 and 400-3. This network 220 can be of advantage in having only one step down stage being operated at any one time for the entire network.

One of the commercial objectives for the all-DC energy transfer device 100 and the all-DC energy transfer network 220 is to increase the distance traveled 310 through the expending of the unit 320 of fuel 214. The energy efficiency will be considered the ratio of how long the ICE runs versus how long the electric motor runs. The fuel efficiency will be rated in units 320 of fuel 214 to the distance traveled 310.

The second implementation requirements for the energy transfer device 100 in an all-DC energy transfer network 220 to support that automobile sustaining a fuel usage of at least 100 mile per gallon, or in metric units, at least 43 kilometers per liter of a fuel such as gasoline.

Assume that the ICE 222 is operated for 30 seconds to generate 50 Kilo-Watts delivered to charge the all-DC energy transfer network 220, where it is stored and discharged to the electric motor 250 over at least 100 seconds under the driving conditions outlined above, before the ICE is again turned on and the energy transfer cycle is repeated. There are 36 intervals of 100 seconds in one hour, so the ICE would run for 18 minutes in the hour. The automobile 210 running at 40 miles per gallon for 70 miles per hour expends about 1.75 gallons for the 70 miles. Using the all-DC energy transfer network 220 the ICE runs only 18 minutes in the hour, thereby expending about 0.5 gallons per hour, which is a fuel efficiency of about 140 miles per gallon or about 60 kilometer per liter. Note that operating the automobile 210 at lower speeds is likely to increase fuel efficiency. Also note, in setting an objective of 100 miles per gallon, there is room in this analysis for experimental factors that are at present not visible and yet achieve the commercial objective.

The second implementation component derivations. Recall FIG. 1. Assume that the first switch SW1 140 is open. The energy transfer from the input DC terminal 102 begins when the energy stored at the first capacitance device 130 reaches its charged threshold. When the energy stored at the first capacitive device crosses its charged threshold, the first switch SW1 is closed, and energy begins to flow from the first to the second capacitive device C2 160, through the inductive device L1 150. The energy efficiency of the energy transfer device 100 can be seen the difference between how much energy is stored in the first capacitive device C1 130 at the start, versus how much energy is transferred to the second capacitive device C2 160 before the switch SW1 140 opens the connection between the terminals 1 and 2 of the switch.

FIG. 15A to 15I show some features of at least the first capacitive device 1310, which may also be applicable to one or more of the other capacitive devices C2 160, C3 560, and/or C4 1160.

To store 5-6 Mega-Joules in the first capacitive device C1 130 will require the capacitance be in the range of 1 to 1.4 Farads and the voltage in the range of 2,700 to 3,000 Volts. Recalling from the prior art that $C = e_r e_0 A/d$, where C is the capacitance in farads, A is the area of overlap of the parallel plates, $e_r$ is the permittivity of the dielectric, $e_0$ is the electric constant (roughly $8.854 \times 10^{-12}$ F/meter), and d is the separation of the plates in meters.

Figure 15A:
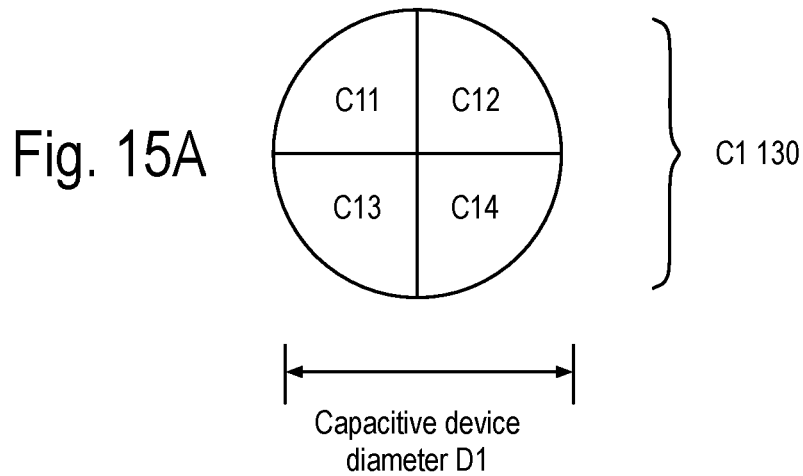
FIG. 15A to 15I show some features of at least the first capacitive device, which may also be applicable to one or more of the other capacitive devices.

FIG. 15A shows a top view of the first capacitive device C1 130. The first capacitive device may contain electrode plates shaped like circles or fractions of circles, such as quarter circles. The first capacitance device C1 130 may be contain 4 separate capacitive quarters C11 to C14. These capacitive quarters may be electrically coupled and bonded together to form the first capacitive device C1 130. The capacitive device diameter D1 may be at most one member of the group consisting of 1.2 meters, 1 meter, 0.75 meters, 0.5 meters and 0.25 meters. Note that A, the area of overlapping plates is approximately $0.25 * pi * D1^2$.

Figure 15B:
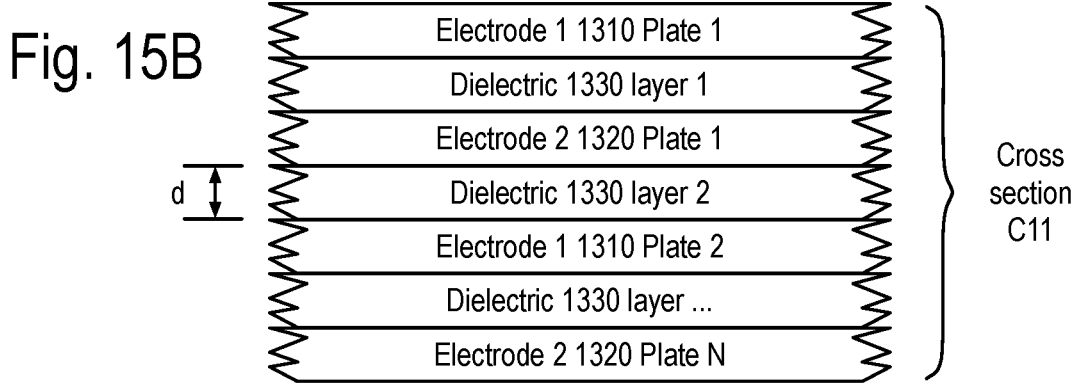

FIG. 15B shows a simplified example of a cross section of one of the capacitive quarters, for instance C14 of FIG. 15A. This cross section may include a collection of layers and plates. In this example, the layers are layers of a dielectric 1330. The dielectric 1330 may be a ceramic, possibly consisting essentially of one or more members of the group consisting of Barium Titanate, or Barium-Strontium Titanate or Strontium Titanate. The dielectric 1330 may be provided as a powder, possibly highly compressed or processed to evacuate loss-of-capacitance voids and/or moisture. Such powders may be referred to as 'sintered'. The layers of dielectric 1330 may have thickness of essentially d, where d has been modeled as the distance between the plate 1 and plate 2. Electrode 1 1310 may include all of the Plate 1's. Electrode 2 1320 may include all of the Plate 2's. Electrode 1 1310 and electrode 2 1320 may be composed of essentially the same substance, such as an alloy of a metallic elements, where the metallic element may further be a member of the group consisting of tin and aluminum.

Figure 15C:
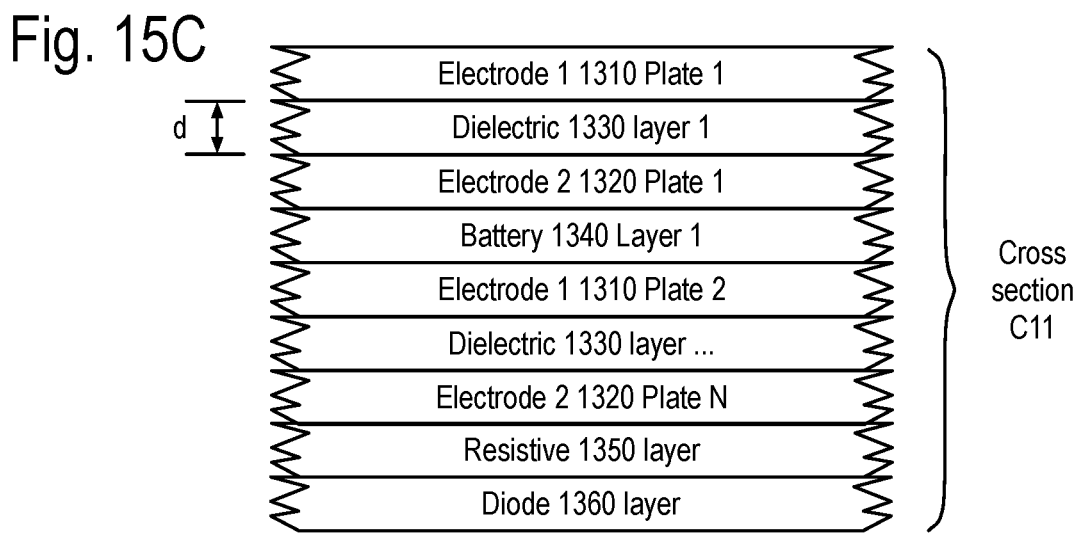

FIG. 15C shows a refinement of the layer diagram of FIG. 15B further including at least one of a battery 1340 layer, a resistive 1350 layer and/or a diode 1360 layer. The battery 1340 layer may be used to additionally store energy that is possibly released over a longer time than the energy released between the plates 1 and 2 and the dielectric layer. The resistive 1350 layer may remove the need for one or more resistors to be separate components in the all-DC energy transfer device 100. The diode 1360 layer may act to protect the first capacitive device C1 130 from undershoot conditions in the all-DC energy transfer device 100.

Figure 15D:
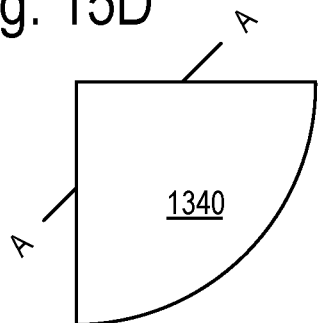

FIG. 15D shows a cross section A-A of the capacitive component C14 from FIG. 15A.

Figure 15E:
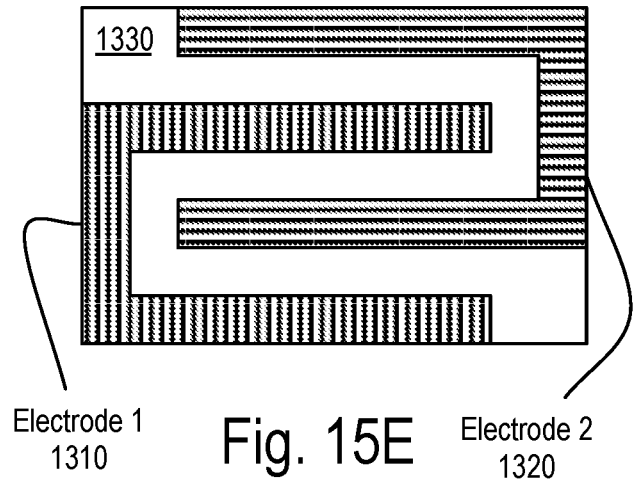

FIG. 15E shows the coupling of the individual plates of the first electrode 1310 to form the first electrode, the coupling of the individual plates of the second electrode 1320 to form the second electrode, as well as the disposition of the dielectric 1330 separating the plates of the two electrodes 1310 and 1320 in the cross section of A-A of FIG. 15D.

Figure 15F:
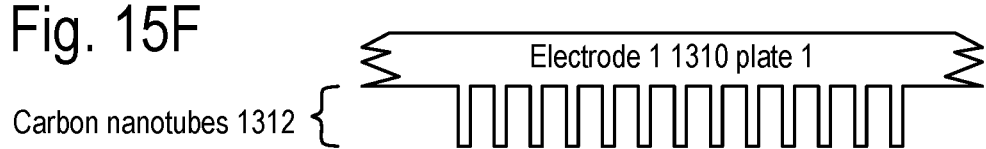
Figure 15G:
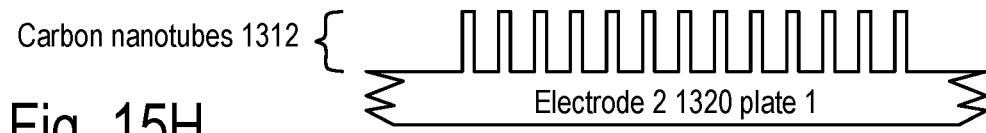
Figure 15H:
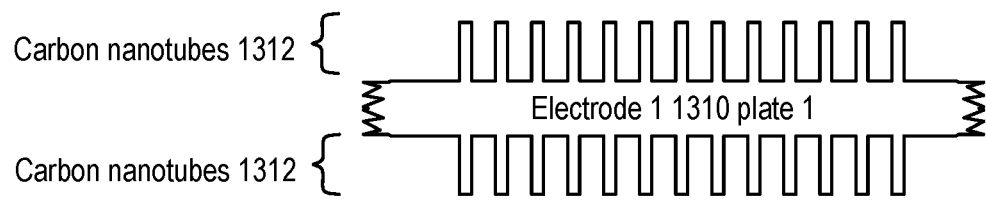

FIG. 15F to FIG. 15H show some examples of one or more sides of one or more plates of one of more electrodes including fingers such as carbon nanotubes deposited and/or grown on the side of the plate. The fingers, such as carbon nanotubes, can increase the effective area of the surface, possibly by a factor of at least 110%, 150%, 175%, 200%, 250% or more over the macroscopic area of the plate. These features can improve the capacitance of the capacitive device, such as C1, C2, C3 and/or C4 by that same factor while reducing the size and weight required for the device.

FIG. 15F shows an example plate of the first electrode 1 1310 including on a first surface upon which carbon nanotubes 1312 have been deposited and/or grown.

FIG. 15G shows an example plate of the second electrode 2 1320 including on a first surface upon which carbon nanotubes 1312 have been deposited and/or grown.

FIG. 15H shows one of the electrodes 1310 with carbon nanotubes 1312 deposited and/or grown on two faces of the plate. Note that this Figure can also be applied to the second electrode 2 1320.

Figure 15I:
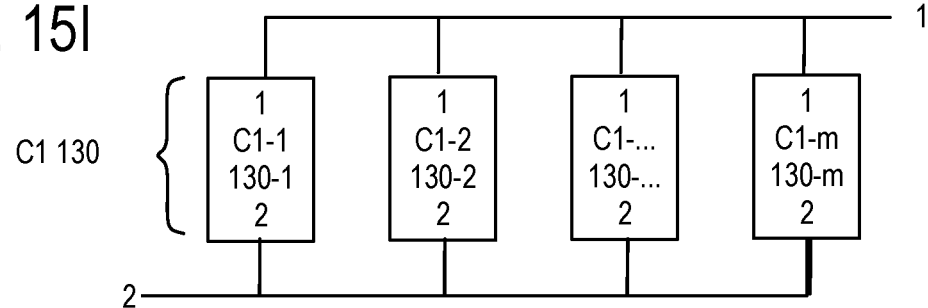

FIG. 15I shows an example of the first capacitive device C1 130 including m instances C1.1 130.1 to C1.m 130.m that have their first terminals connected to form the first terminal 1 of the first capacitive device C1 130. The second terminal 2 of C1.1 to C1.m are also connected to form the second terminal 2 of C1 130. Such circuits couplings are often referred to as a parallel circuit of the components. As used herein, the m is at least two.

Implementations of the second capacitive device C2 150 may include circuits such as shown in FIG. 15I, where m is 6. In the second implementation, the service voltage between the service terminal and the common terminal may be 64 volts, or a small multiple of 64 volts. For the moment, assume that the service voltage is 64 volts and the second capacitive device C2 is required to store 2 or more million Joules. The components in that implementation, C2.1 to C2.m may be stacks (a series circuit) of super capacitors, each stack possibly implement 125 Farad at 64 volts. Such components are in mass production today.

Note that in various implementations, combinations of any or all of the features of the capacitive device C1 130 may be used to implement any or all of the other capacitive devices C2 160, C3 560, and/or C4 1160.

In some of the second implementations of the all-DC energy transfer network 220, preferred assemblies as shown in FIG. 4, FIG. 7, and FIG. 10 may include dual output stages, each of which can be separately charged and discharged may be favored.

In some of the second implementations of the all-DC energy transfer network 220, a single stage all-DC energy transfer device 100 may be preferred as shown in FIG. 4 and FIG. 6.

In some of the second implementations of the all-DC energy transfer network 220, a dual stage all-DC energy transfer device 700 may be preferred as shown in FIG. 7 and FIG. 8.

In some of the second implementations of the all-DC energy transfer network 220, an all-DC energy transfer device 900 a shared output inductor may be preferred as shown in FIG. 10 and FIG. 12. In these Figures, the all-DC capacitance stage may be implemented as shown in FIG. 11.

The all-DC energy device 900 with the shared inductor may be implemented with a single stage all-DC energy transfer device 100 as shown in FIG. 9A and FIG. 9B, or implemented with a dual stage all-DC energy transfer device 700 as shown in FIG. 9C and FIG. 9D.

The shared inductor L3 950 may be directly connected between the output DC terminal 104 to the shared output DC terminal 904 as shown in FIG. 9A. Alternatively, the shared inductor L3 950 may be connected across a fifth diode D5 and/or across a sixth diode D6 between the output DC terminal 104 to the shared output DC terminal 904, respectively, as shown in FIG. 9B.

The shared inductor L3 950 may be directly connected between the output DC terminal 404 and the shared output DC terminal 904 as shown in FIG. 9C. Alternatively, the shared inductor L3 950 may be connected across a seventh diode D7 and/or across an eighth diode D8 between the output DC terminal 404 and the shared output DC terminal 904, respectively, as shown in FIG. 9D.

Recall that the third implementation of the all-DC energy transfer network 220 adapts the energy transfer device 100 in an all-DC energy transfer network 220 to operate in the automobile 210 to sustaining fuel usage of at least 200 miles per gallon or at least 86 kilometers per liter. Put another way, when the unit 320 is one gallon, the expected distance traveled is over 200 miles. When the unit 320 is one liter, the expected distance traveled is over 86 kilometers.

Assuming that production costs are likely to be a prevalent concern in automotive manufacture, the simpler circuits that are found reliable will be preferred. However, being able to field a second version of the automobile 210 with twice the fuel efficiency has great business value, particularly if such a deployment has a fast time to market.

If the second implementation requirements for the all-DC energy transfer network 220 are met by using two all-DC SD stages 400-1 and 400-2 as shown in FIG. 4 or FIG. 7, then a third implementation of the all-DC energy transfer network 220 using four instances of the all-DC SD stages 400-1 to 400-4 as shown in FIG. 6 or FIG. 8 may be preferred.

If the second implementation requirements for the all-DC energy transfer network 220 are met by two instances of the all-DC capacitance stages 1000-1 and 1000-2 as shown in FIG. 10, then a third implementation of the all-DC energy transfer network 220 using four instances of the all-DC capacitance stages 1000-1 to 1000-4 as shown in FIG. 12 may be preferred.

The inductive devices L1 150, L2 550, and L3 950, may initially be implemented with commercially available inductors.

However, there may be a need for improvements in cooling and calibration for the inductors.

Inductors characterized for their performance in the various implementations of the all-DC energy transfer device 100 and/or elsewhere in the all-DC energy transfer network 220 may be preferred, in that their performance designation will reflect both the high energy traversing them, as well as the low frequencies involved in their general operation.

Inductors suitable for use in various implementations of this invention may also require a cooling layer, possibly of a liquid dielectric, such as mineral oil.

The switches SW1 140, SW2 410-2, SW 3 410-3, SW4 540, SW5 410-5, and/or SW6 410-6 may be implemented by solid-state switches already in production.

However, there may be a need for reliable mechanical switch implementations, for example, a relay including a armature cavity in which an armature travels between the opened and closed connection of the terminals 1 and 2.

The armature cavity may be filled with a liquid dielectric to suppress the effects of arcing as the armature opens and closes the connection between the switch terminals 1 and 2.

The mechanical switch may further include a plunger adapted to pull the liquid dielectric away from the gap between the armature and the terminal contacts when the switch is being closed and push liquid dielectric into the gap when the switch is being opened.

While more than two stages of the all-DC energy transfer device are considered within the scope of this invention, their discussion is limited to this paragraph for the sake of brevity.

While more than four instances of all-DC SD stages 400 are considered within the scope of this invention, their discussion is limited to this paragraph for the sake of brevity. The number of instances of the all-DC SD stages 400 may be at least one, and is not constrained to be a multiple of 2. For example, three stage cycling of the electric motor 250 may be preferred, leading to 3 instances in the all-DC energy transfer network 220.

Figure 16:
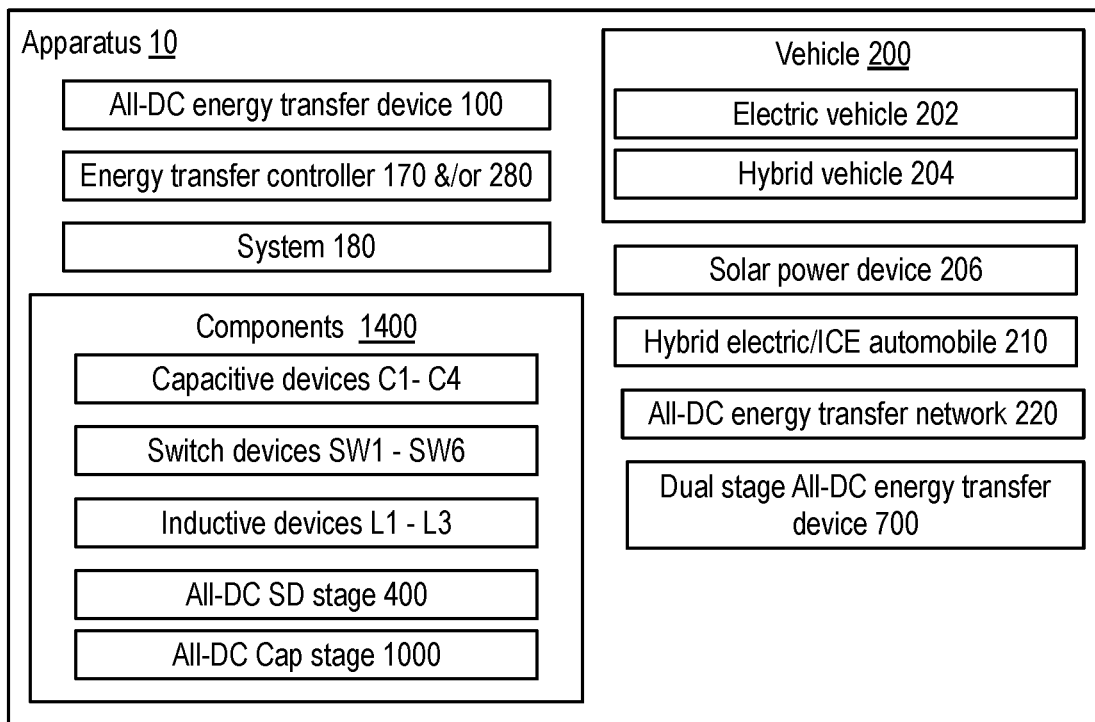
FIG. 16 summarizes some of the apparatus of this invention that may be separately manufactured in accord with or adapted to meet the requirements of various embodiments and/or implementations of this invention.

FIG. 16 summarizes some of the apparatus 10 of this invention that may be separately manufactured in accord with or adapted to meet the requirements of various embodiments and/or implementations of this invention. The apparatus 10 includes, but is not limited to, the all-DC energy transfer device 100, the dual stage all-DC energy transfer device 700, the energy transfer controllers 170 and/or 280, an all-DC energy transfer network 220, components 1400 of use in such circuits, apparatus that benefits from including and/or using the all-DC energy transfer device and/or network and methods of operating the above in accord with this invention.

The components 1400 may include, but are not limited to, at least one of the capacitive devices C1 to C4, at least one switch devices SW1 to SW6, at least one of the inductive devices L1 to L3, at least one of the all-SD stages 400, and/or at least one of the all-DC capacitive devices 1000, each of which are defined and disclosed in the summary and detailed disclosure.

The application apparatus may include, but are not limited to, a hybrid electric vehicle, an electric vehicle, and/or a solar power devices.

Any of the vehicles may be an automobile, a truck, a bus, a trolley, a train, an airplane, whether manned or unmanned, a ship, for surface and/or subsurface travel, a satellite, and/or space vehicle.

The preferred vehicles may be the automobile, the truck, or the bus. T

The solar power devices may include, but are not limited to energy transfer devices from solar power arrays and/or solar energy storage, whether these devices are on-grid or off-grid.

Of particular note in this disclosure is the hybrid electric/internal combustion engine (ICE) automobile 210.

Figure 17:
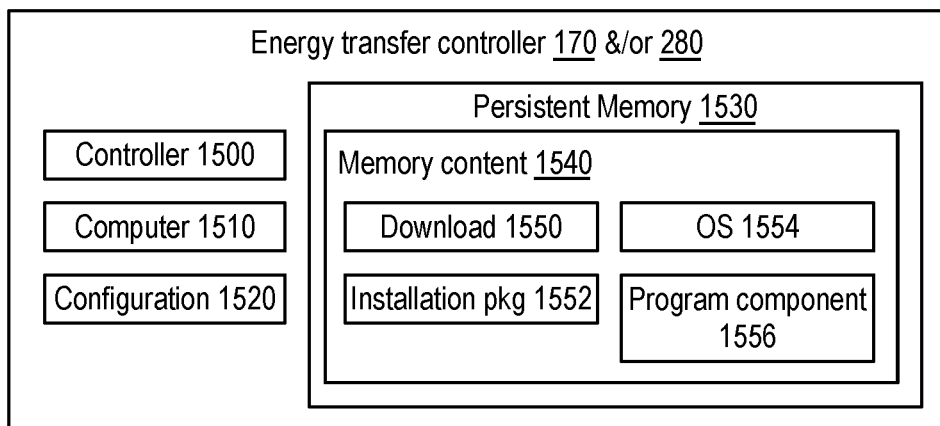
FIG. 17 shows at least one of the energy transfer controllers may include at least one instance of at least one member of the group consisting of a controller, a computer, a configuration, and a persistent memory containing at least one of the memory contents.

FIG. 17 shows the energy transfer controller 170 and/or 280 may include at least one instance of at least one member of the group consisting of a controller 1500, a computer 1510, a configuration 1520, and a persistent memory 1530 containing at least one of the memory contents 1540.

The controller 1500 may include at least one input, at least one output, and possibly at least one internal state. The controller 1500 may respond to the input by altering the internal state. The controller 1500 may generate the output based upon at least one value of the input and/or at least one value of at least one of the internal states. The internal state may implement one or more instances of the persistent memory 1530, the memory contents 1540, and/or the configuration 1520.

The computer 1500 includes at least one instruction processor and at least one data processor. Each of the data processors is instructed by at least one of the instruction processors. The computer may implement one or more instances of the persistent memory 1530, the memory contents 1540, and/or the configuration 1520.

The memory content 1540 may be retained in a persistent memory 1530, the controller 1500 and/or the computer 1510.

The memory content 1540 may include at least one instance of at least one of at least one of a download 1550, an installation package 1552, an operating system 1554 and/or at least one program component 1556, any of which may implement at least part of a method of operating some element of this invention.

As used herein, the persistent memory 1530 may include at least one non-volatile memory component and/or at least one volatile memory component provided a power source adapted to remove its volatility in ordinary operation, whether or not the apparatus 10 is currently engaged in generating electrical power for use by the all-DC energy transfer device 100 and/or the all-DC energy transfer network 220. The non-volatile memory is adapted to retain its memory content 1540 whether or not the memory is provided electrical power. The volatile memory may lose its memory content 1540 without being provided some electrical power over a period of time.

FIG. 18 shows some examples of the program component 1556 of FIG. 17, any of which may implement at least one component of a method of operating at least part of at least one of the all-DC energy transfer device 100, the all-DC energy transfer network 220, the system 180 including and/or using at least one of 100 and/or 220, in particular the hybrid electric/ICE automobile 210. Just as a method comprises one or more steps, the program component 1556 comprises one or more of the following instructed operations:

Program operation 1600 supports operating the all-DC energy transfer device 100 in response to sensing the input DC terminal 102 and/or the output DC terminal 104 with respect to the common terminal 106. The energy transfer controller 170 may alter the control state 172 to provide one of the close state 174 or the open state 176 to control terminal C of the first switch SW1 140.

Program operation 1610 supports operating the all-DC energy transfer network 220 in response to sensing the nigh energy terminal 202 and/or the service terminal 204 with respect to the common terminal 106.

Program operation 1620 supports operating the dual stage all-DC energy transfer device 700 to sensing at least one of its terminals 102 and/or 404 with respect to the common terminal 106. These operations may include altering two control states 172-1 and 172-2 to separately control the two switches in the dual stage all-DC energy transfer device 700 via the control terminals 108 and 408.

Program operation 1630 supports operating at least one Step Down (SD) stage 400 in response to sensing the high energy terminal 202 and/or the service terminal 204 with respect to the common terminal 106.

Program operation 1640 supports operating at least one Capacitance (Cap) stage 100 in response to sensing high energy terminal 202 and/or service terminal 204 with respect to common terminal 106.

Program operation 1650 supports operating at least part of the system 180 in response to at least one sensed DES of at least one of all-DC energy transfer device 100 and/or at least part of all-DC energy transfer network 220.

Program operation 1660 supports operating the hybrid electric/ICE auto 210 in response to at least one sensed DES of at least part of all-DC energy transfer network 220.

While these examples and discussions are presented to disclose and enable the claims of the present and future divisional and continuation applications in multiple countries, one of ordinary skill in the technical arts involved herein will recognize that the scope of this invention exceeds what these words can say about it.

For example, the simplest all-DC energy transfer device 100 may consist, beyond the defined elements of the energy transfer device, of at least one internal DES contributing to the generation of the output DC DES that consists essentially of a DC DES, referred to herein as the internal DC DES.

Another example, one or more of the connections between the components of the all-DC energy transfer device 100 as shown in FIG. 1 may not include diodes D1 or D2, although these are shown in the Figure.

Another example, between any of the connections of FIG. 1 and subsequent Figures, additional components such as resistors, capacitors, diodes, and/or inductors, to name some examples, may be coupled, provided that these additional components do not disrupt the internal DC DES that contribute to DC energy transfer.

What is claimed is:

1. An apparatus comprising:
   an electrical generator;
   an energy transfer device coupled to the generator through a high-energy terminal, and having:
      a first capacitor,
      a high-energy inductor having a high side coupled through a first switch to the first capacitor, and a low side,
      a second capacitor coupled to the high energy inductor through the low side,
      the first switch coupling the second capacitor to the first capacitor and charging the second capacitor through the low side at a lower voltage than the high side to constitute a first step down stage, and configured to store energy from the first capacitor in the second capacitor through the inductor when in a closed state,
      one or more additional step down stages, each step down stage comprising an additional switch, an additional inductor, and an additional capacitor,
      a service terminal coupled between the first switch and each additional switch,
      an energy transfer controller controlling an open or closed state of the first switch and additional switches, and controlling a charging of each additional capacitor by analysis of state conditions at the service terminal; and
      an electrical motor coupled to the energy transfer device and a mechanical drive system and receiving electrical power through the service terminal.

2. The apparatus of claim 1 wherein the generator is coupled to an internal combustion engine (ICE) system burning fuel to further power the mechanical drive system, and further wherein the mechanical drive system comprises an axle and wheel system of a vehicle.

3. The apparatus of claim 2 wherein the energy transfer device is configured to increase efficiency of the ICE as it burns the fuel, and wherein the vehicle is a hybrid vehicle using both fuel and electrical power for propulsion.

4. The apparatus of claim 1 wherein the first capacitor has a capacitance of at least 1 Farad and stores at least 1 MegaJoule of energy, and the second capacitor has a capacitance of at least 100 Farads, and further wherein the first capacitor comprises between three and five capacitive full or fractional electrode plates of a diameter between 200 millimeters to 300 millimeters and having a ceramic dielectric, and wherein the inductor includes a cooling layer comprising a liquid dielectric suitable for use in high energy transfer applications.

5. The apparatus of claim 1 further comprising one or more diodes configured to maintain current flow in one direction from the input terminal to the output terminal, and wherein the switch is closed by the energy transfer controller when the first capacitor reaches its charged threshold.

6. The apparatus of claim 1 wherein a voltage difference between the service terminal and a common terminal is 64 volts, or a multiple of 64 volts, and wherein each additional capacitor has a capacitance of 125 Farads at 64 volts.

7. The apparatus of claim 6 wherein the first step down stage and additional step down stages are switched through respective switches by the energy transfer controller in response to sensing the high-energy relative to the service terminal or a common terminal.

8. The apparatus of claim 1 wherein the first capacitor and second capacitor each comprise a plurality of capacitive quarters electrically coupled and bonded together to form a circular capacitive device comprising individual capacitive elements.

9. The apparatus of claim 1 wherein an open state of the switch causes energy transferred from the high-energy terminal to be stored in the first capacitor until a charged threshold is reached, and a closed state of the switch causes the stored energy to flow from the first capacitor to the second capacitor through the high-energy inductor.

10. The apparatus of claim 1 wherein the high-energy terminal receives short time-window time-varying power energy having a power spectrum concentrated in a direct current (DC) spectrum or near 0 frequency component.

11. A method comprising:
   coupling an energy transfer device to a generator through a high-energy terminal;
   providing a first capacitor having a capacitance of at least 1 Farad and storing at least 1 MegaJoule of energy, a high-energy inductor having a high side coupled through a first switch to the first capacitor, and a low side, and a second capacitor having capacitance of at least 100 Farads, and coupled to the high energy inductor through the low side;
   coupling the second capacitor to the first capacitor through the first switch and charging the second capacitor through the low side at a lower voltage than the high side to constitute a first step down stage, and configured to store energy from the first capacitor in the second capacitor through the inductor when in a closed state;
   providing one or more additional step down stages, each step down stage comprising an additional switch, an additional inductor, and an additional capacitor;
   coupling a service terminal between the first switch and each additional switch,
   controlling, through an energy transfer controller, an open or closed state of the first switch and additional switches, and controlling a charging of each additional capacitor by analysis of state conditions at the service terminal; and coupling an electrical motor to the energy transfer device and a mechanical drive system for receiving electrical power through the service terminal.

12. The method of claim 11 wherein the first capacitor has a capacitance of at least 1 Farad and stores at least 1 MegaJoule of energy, and the second capacitor has a capacitance of at least 100 Farads, and wherein the first capacitor comprises between three and five capacitive full or fractional electrode plates of a diameter between 200 millimeters to 300 millimeters and having a ceramic dielectric, and wherein the inductor includes a cooling layer comprising a liquid dielectric suitable for use in high energy transfer applications.

13. The method of claim 12 wherein a voltage difference between the service terminal and a common terminal is 64 volts, or a multiple of 64 volts, and wherein each additional capacitor has a capacitance of 125 Farads at 64 volts.

14. The method of claim 12 wherein the first capacitor and second capacitor each comprise a plurality of capacitive quarters electrically coupled and bonded together to form a circular capacitive device comprising individual capacitive elements.

15. The method of claim 11 wherein an open state of the switch causes energy transferred from the high-energy terminal to be stored in the first capacitor until a charged threshold is reached, and a closed state of the switch causes the stored energy to flow from the first capacitor to the second capacitor through the high-energy inductor.

16. The method of claim 11 further comprising receiving, at the high-energy terminal, a short time-window time-varying power energy having a power spectrum concentrated in a direct current (DC) spectrum or near 0 frequency component.

17. The method of claim 16 wherein the first step down stage and additional step down stages are switched through respective switches by the energy transfer controller in response to sensing the high-energy terminal relative to the service terminal or a common terminal.

18. The method of claim 11 wherein the generator is coupled to an internal combustion engine (ICE) system burning fuel to further power the mechanical drive system, and further wherein the mechanical drive system comprises an axle and wheel system of a vehicle, and yet further wherein the energy transfer device is configured to increase efficiency of the ICE as it burns the fuel.

19. An apparatus comprising:
an electrical generator;
a high-energy inductor coupled between a first capacitor and a second capacitor, and having a high side coupled through a first switch to the first capacitor, and a low side coupled to the second capacitor, wherein
the first switch couples the second capacitor to the first capacitor and charges the second capacitor through the low side at a lower voltage than the high side to constitute a first step down stage of a plurality of step down stages, and configured to store energy from the first capacitor in the second capacitor through the inductor when in a closed state, wherein each additional step down stage of the plurality of step down stages comprises an additional switch, an additional inductor, and an additional capacitor, and
a service terminal coupled between the first switch and the second capacitor, and each additional switch, and
an energy transfer controller controlling an open or closed state of the first switch, and controlling a charging of the second capacitor by analysis of state conditions at the service terminal, and wherein an open state of the switch causes energy transferred from the high-energy terminal to be stored in the first capacitor until a charged threshold is reached, and a closed state of the switch causes the stored energy to flow from the first capacitor to the second capacitor through the high-energy inductor; and
an electrical motor coupled to the energy transfer device and a mechanical drive system and receiving electrical power through the service terminal.

* * * * *